US 9,146,674 B2

(12) United States Patent
Karlsson et al.

(10) Patent No.: US 9,146,674 B2
(45) Date of Patent: Sep. 29, 2015

(54) GUI CONTROLS WITH MOVABLE TOUCH-CONTROL OBJECTS FOR ALTERNATE INTERACTIONS

(75) Inventors: David Karlsson, Norrköping (SE); Aron Ernvik, Linköping (SE); Magnus Ranlöf, Norrköping (SE); Hong Lo, Linköping (SE); Joackim Pennerup, Linköping (SE); Igor Milososki, Linköping (SE)

(73) Assignee: Sectra AB, Linkoping (SE)

( * ) Notice: Subject to any disclaimer, the term of this patent is extended or adjusted under 35 U.S.C. 154(b) by 1060 days.

(21) Appl. No.: 13/218,873

(22) Filed: Aug. 26, 2011

(65) Prior Publication Data

US 2012/0131488 A1 May 24, 2012

Related U.S. Application Data

(60) Provisional application No. 61/416,533, filed on Nov. 23, 2010.

(51) Int. Cl.
G06F 3/048 (2013.01)
G06F 3/0488 (2013.01)

(52) U.S. Cl.
CPC ........ G06F 3/04886 (2013.01); G06F 3/04883 (2013.01); G06F 2203/04806 (2013.01); G06F 2203/04808 (2013.01)

(58) Field of Classification Search
USPC ........................................................ 715/771
See application file for complete search history.

(56) References Cited

U.S. PATENT DOCUMENTS

| 5,724,985 | A | * | 3/1998 | Snell et al. .................... 600/510 |
| 2001/0055016 | A1 | | 12/2001 | Krishnan |
| 2005/0024322 | A1 | * | 2/2005 | Kupka ........................... 345/156 |
| 2007/0016047 | A1 | | 1/2007 | Tsunoda et al. |

(Continued)

FOREIGN PATENT DOCUMENTS

WO WO 2009018314 A2 * 2/2009 .............. G06F 3/048

OTHER PUBLICATIONS

Andriole et al., *Optimizing Analysis, Visualization, and Navigation of Large Image Data Sets: One 5000-Section CT Scan Can Ruin Your Whole Day*, Radiology, May 2011, pp. 346-362, vol. 259: No. 2.

(Continued)

*Primary Examiner* — William Bashore
*Assistant Examiner* — Henry Orr
(74) *Attorney, Agent, or Firm* — Myers Bigel Sibley & Sajovec, P.A.

(57) ABSTRACT

Systems, methods and circuits for providing GUI controls with touch-gesture inputs with movable alternate interaction objects. The GUI controls include (i) a set of base interactions associated with touch gestures available over substantially an entire viewing area and (ii) a plurality of alternate interaction icons that are individually movable over the display via touch gestures by a user touch to allow one or more users to interact with the visualization presented on the display. The alternate interaction icons each have a set of alternate interaction choices that are different from the set of base interactions and appear on the display only when a selected respective alternate interaction icon is touched.

24 Claims, 12 Drawing Sheets

(56) References Cited

U.S. PATENT DOCUMENTS

| | | | |
|---|---|---|---|
| 2007/0198744 A1* | 8/2007 | Wensley et al. | 709/248 |
| 2007/0255137 A1 | 11/2007 | Sui et al. | |
| 2007/0255139 A1 | 11/2007 | Deschinger et al. | |
| 2008/0051652 A1 | 2/2008 | Ichioka et al. | |
| 2008/0055310 A1 | 3/2008 | Mitchell et al. | |
| 2009/0007017 A1* | 1/2009 | Anzures et al. | 715/835 |
| 2009/0307623 A1* | 12/2009 | Agarawala et al. | 715/765 |
| 2010/0131294 A1* | 5/2010 | Venon et al. | 705/3 |
| 2011/0047461 A1* | 2/2011 | Bargmann | 715/702 |
| 2011/0148796 A1* | 6/2011 | Hollemans et al. | 345/173 |
| 2011/0310064 A1* | 12/2011 | Keski-Jaskari et al. | 345/178 |

OTHER PUBLICATIONS

Bade et al., *Usability Comparison of Mouse-based Interaction Techniques for Predictable 3d Rotation*, Lecture Notes in Computer Science, 2005, 13 pages, vol. 3638/2005, 924.

Bowman et al., *3D User Interfaces: New Directions and Perspectives*, IEEE Computer Society, Nov./Dec. 2008, pp. 20-36, vol. 28 No. 6.

Burton et al., *Clinical, educational, and epidemiological value of autopsy*, Lancet, 2007, pp. 1471-1480, vol. 369.

Buxton, William, Chunking and Phrasing and the Design of Human-Computer Dialogues, Proceedings of the IFIP World Computer Congress, 1986, pp. 475-480 (printed on 9 pages).

Carpendale, Sheelagh, *Evaluating Information Visualizations*, Lecture Notes in Computer Science, 2008, pp. 19-45, vol. 4950/2008.

Coffey et al., Slice WIM: *A Multi-Surface, Multi-Touch Interface for Overview+Detail Exploration of Volume Datasets in Virtual Reality*, I3D Symposium on Interactive 3D Graphics and Games, Feb. 18-20, 2011, pp. 191-198.

Edelmann et al., *The DABR—A Multitouch System for Intuitive System for 3D Scene Navigation*, 3DTV Conference: The True Vision—Capture, Transmission and Display of 3D Video, 2009, pp. 1-4.

Frohlich et al., *On 3D Input Devices*, IEEE Computer Graphics and Applications, Projects in VR, © 2006, pp. 15-19, vol. 26 Issue 2.

Gallo et al., *A user interface for VR-ready 3D medical imaging by off-the-shelf input devices*, Computers in Biology and Medicine, 2010, pp. 350-358, vol. 40.

Hancock et al., *Rotation and Translation Mechanisms for Tabletop Interaction*, Proceedings of the First IEEE International Workshop on Horizontal Interactive Human-Computer Systems (Tabletop '06), 2006, pp. 79-88.

Hancock et al., *Shallow-Depth 3D Interaction: Design and Evaluation of One-, Two- and Three-Touch Techniques*, CHI 2007 Proceedings of the SIGCHI conference on Human factors in computing systems, 2007, pp. 1147-1156.

Hancock et al., *Sticky Tools: Full 6DOF Force-Based Interaction for Multi-Touch Tables*, ITS '09 Proceedings of the ACM International Conference on Interactive Tabletops and Surfaces, ©2009, pp. 133-140.

Hornecker et al., *Collaboration and Interference: Awareness with Mice of Touch Input*, CSCW '08 Proceedings of the 2008 ACM conference on Computer supported cooperative work, ©2008, pp. 167-176.

Hu et al., *The feasibility of three-dimensional displays of the thorax for preoperative planning in the surgical treatment of lung cancer*, European Journal of Cardio-thoracic Surgery, 2007, pp. 506-511, vol. 31.

Isenberg et al., *Interactive Exploratory visualization of 2D Vector Fields*, Computer Graphics Forum, May 2008, pp. 983-990. vol. 27 No. 3.

Isenberg et al., *An Exploratory Study of Co-located Collaborative Visual Analytics Around a Tabletop Display*, IEEE Symposium on Visual Analytics Science and Technology (VAST), 2010, pp. 179-186.

Jung et al., *Adapting X3D for Multi-touch Environments*, Web3D '08 Proceedings of the 13$^{th}$ international symposium on 3D web technology, 2008, pp. 27-30 and 122.

Kin et al., *Determining the Benefits of Direct-Touch, Bimanual, and Multifinger Input on a Multitouch Workstation*, Proceedings of Graphics Interface 2009, pp. 119-124.

Krueger et al., *Fluid Orientation on a Tabletop Display; Integrating Rotation and Translation*, University of Calgary Computer Science, http://hdl.handle.net/1880/45767, Apr. 5, 2004, 10 pages.

Krueger et al., *The Responsive Workbench*, IEEE Computer Graphics and Applications, May 1994, pp. 12-15, vol. 14 Issue 3.

Lee et al., *Preoperative Simulation of Vascular Anatomy by Three-Dimensional Computed Tomography Imaging in Laparoscopic Gastric Cancer Surgery*, Journal of the American College of Surgeons, Dec. 2003, pp. 927-936, vol. 197, Issue 6.

Lin et al., *Interaction with Medical Volume Data on a Projection Workbench*, Int Conf Artif Real Telexistence, 2000, pp. 148-152, vol. 10.

Liu et al., TNT: *Improved Rotation and Translation on Digital Tables*, GI '06 Proceedings of Graphics Interface, 2006, pp. 25-32.

Ljung et al., *Full Body Virtual Autopsies using a State-of-the-art Volume Rendering Pipeline*, IEEE Transactions on Visualization and Computer Graphics, 2006, pp. 869-876, vol. 12, No. 5.

Lundstrom et al., Multi-Touch Table System for Medical Visualization: Application to Orthopedic Surgery Planning, IEEE Transactions on Visualization and Computer Graphics, Dec. 2011, pp. 1775-1784, vol. 17, No. 12.

Martinet et al., *3D Positioning Techniques for Multi-touch Displays*, VRST '09 Proceedings of the 16$^{th}$ ACM Symposium on Virtual Reality Software and Technology, 2009, pp. 227-228.

Martinet et al., *The Effect of DOF Separation in 3D Manipulation Tasks with Multi-touch Displays*, VRST '10 Proceedings of the 17$^{th}$ ACM Symposium on Virtual Reality Software and Technology, 2010, pp. 111-118.

McLachlan et al., *Teaching anatomy without cadavers*, Medical Education, 2004, vol. 38, Issue 4, pp. 418-424.

North et al., *Understanding Multi-touch Manipulation for Surface Computing*, Lecture Notes in Computer Science, 2009, vol. 5727/2009, pp. 236-249.

Porter, David H., *Perspective Volume Rendering*, University of Minnesota Supercomputer Institute Research Report UMSI 91/149, May 1991, 34 pages.

Reisman et al., *A Screen-Space Formulation for 2D and 3D Direct Manipulation*, UIST '09 Proceedings of the 22$^{nd}$ annual ACM symposium on user interface software and technology, 2009, pp. 69-78.

Rogers et al., *Finger Talk: Collaborative Decision-Making Using Talk and Fingertip Interaction Around a Tabletop Display*, CHI EA '04 extended abstracts on Human factors in computing systems, 2004, pp. 1271-1274.

Roulson et al., *Discrepancies between clinical and autopsy diagnosis and the value of post mortem histology; a meta-analysis and review*, Histopathology, Dec. 2005, vol. 47, Issue 6, pp. 551-559.

Scharsach, Henning, *Advanced GPU Raycasting*, Proceedings of CESCG, 2005, 8 pages.

Shiozawa, et al., Preoperative virtual simulation of adrenal tumors, Abdominal Imaging, 2009, pp. 113-120, vol. 34. No. 1.

Sielhorst et al., *Advanced Medical Displays: A Literature Review of Augmented Reality*, Journal of Display Technology, Dec. 2008, pp, 451-467, vol. 4, No. 4.

Silen et al., *Advanced 3D visualization in student-centred medical education*, Medical Teacher, 2008, pp. e115-e124, vol. 30, No. 5.

Thayyil et al., *Post-mortem MR and CT imaging in fetuses, newborns and children: an evidenced based approach*, Diagnostic Histopathology, Mini-Symposium: Non-Invasive Radiological Autopsy, Dec. 2010, pp. 565-572, vol. 16, Issue 12.

VAT (Virtual Autopsy Table), Two screenshots of video, http://www.youtube.com/watch?v=bws6vWM1v6g, (video 2:16 minutes long) posted on YouTube Oct. 8, 2009, 2 pages, printed from the internet on Sep. 15, 2011.

VAT (Virtual Autopsy Table), photograph, table shown in U.S. on or about Mar. 25, 2010, 1 page.

Volonte et al., *A lung segmentectomy performed with 3D reconstruction images available on the operating table with an iPad*, Interactive Cardiovascular and Thoracic Surgery, 2011, pp. 1066-1068, vol. 12.

(56) References Cited

OTHER PUBLICATIONS

Yen et al., *Post-mortem forensic neuroimaging: Correlation of MSCT and MRI findings with autopsy results*, Forensic Science International, Nov. 2007, pp. 21-35, vol. 173, Issue 1.

Yu et al., *FI3D: Direct-Touch Interaction for the Exploration of 3D Scientific Visualization Spaces*, IEEE Transactions on Visualization and Computer Graphics, Nov./Dec. 2010, pp. 1613-1622, vol. 16, No. 6.

\* cited by examiner

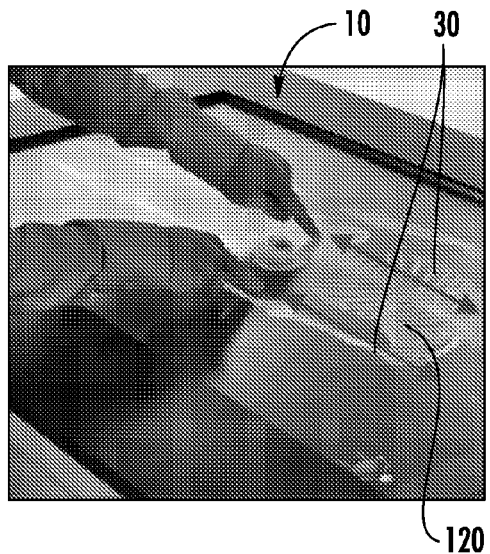
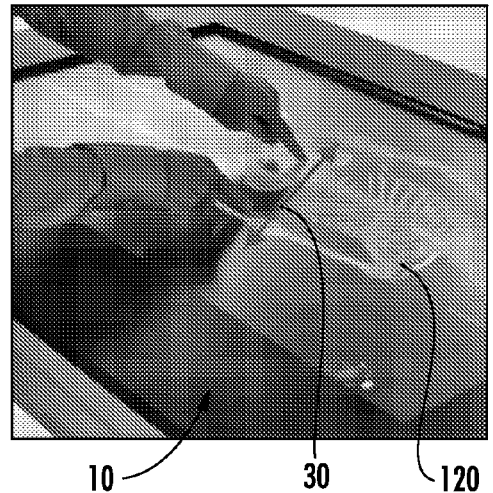
FIG. 11C          FIG. 11D
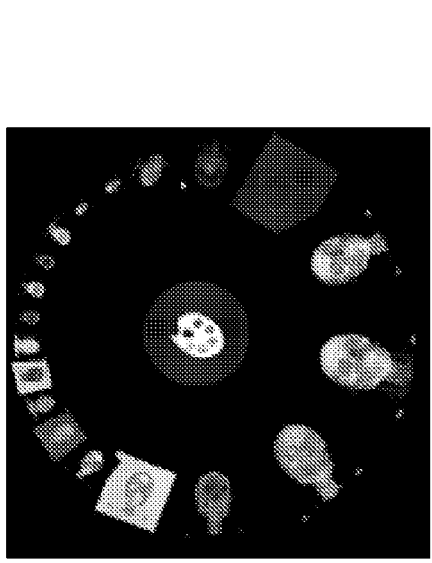
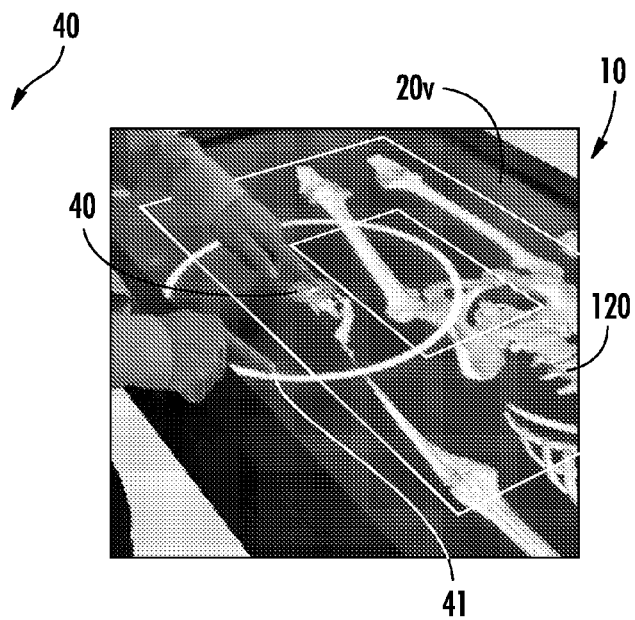
FIG. 12          FIG. 13

GUI CONTROLS WITH MOVABLE TOUCH-CONTROL OBJECTS FOR ALTERNATE INTERACTIONS

RELATED APPLICATIONS

This application claims the benefit of and priority to U.S. Provisional Application Ser. No. 61/416,533, filed Nov. 23, 2010, the contents of which are hereby incorporated by reference as if recited in full herein.

BACKGROUND

Graphical user interface (GUI) controls, including GUI controls that allow touch input, are widely used. However, graphical elements have a certain size and can interfere with a viewing region where a user may prefer to focus on visualized data on the display. In addition, graphical elements such as toolbars and menus are often designed to be used from one direction. This works for some devices with a traditional screen where "up" and "down" are clearly defined for the users. The situation for collaborative work, particularly around a table top (horizontally oriented/mounted) display, is different. In this situation, the users are typically viewing the visualization from different directions. Thus, the notion of "up" and "down" on the screen space is not the same.

Conventionally, some GUIs included fixed dedicated areas of the screen area where alternative interactions are performed or started. The main problem with this approach is that, for collaborative purposes, fixed areas may not be accessible or reachable to all users of the collaborative session.

One of the main benefits with touch interaction is that the user is provided with the ability to interact with objects using touch gestures. However, in order to make intuitive, user-friendly user interfaces for an advanced application, a limited set of base features are directly available to the user and alternative or more advanced features are available only after they have been activated.

For 3D visualization software, for instance in the field or technology area of medical imaging, a base functionality that is immediately accessible to the user in a touch application would involve rotating and panning 3D objects around or in the direction of each of the three coordinate system axes, as well as uniform zoom. Additional features in medical visualizations, such as using tools for removing certain structures in the dataset or changing the current color mapping, require activation of some kind, for instance by setting the application in a certain mode or using graphical user interface controls that affect that dataset in a specific manner.

Unfortunately, a problem with putting an application in a specific mode is that users have to frequently switch modes in order to perform a desired action. For mode-based medical imaging software, it is not uncommon that a user has to switch between two modes several times in order to highlight a certain finding in the dataset. In addition, the mode-based approach is not recommend for displays providing collaborative work since it is difficult for participants of a collaborative session to follow mode changes.

Furthermore, for touch input, it is not uncommon that the same gestures are used in multiple or even all modes, meaning that the same user action triggers different features in the software depending on which mode the application is currently in. This can confuse users, especially if the application is used in a collaborative environment.

There remains a need for alternate GUIs that can allow for more intuitive and user-friendly interaction with users.

SUMMARY OF EMBODIMENTS OF THE PRESENT INVENTION

Embodiments of the present invention provide GUIs with Movable Objects for Alternate Interaction, "MOfAI", where all features (degrees of freedom) designed for touch input can be made instantly available to one or several users no matter if the display device is mounted in a horizontal or vertical position. The flexible nature of these objects allows all participants of a collaborative session to take an active part in the interaction. At the same time, all participants can easily follow and understand how the current user(s) are interacting with the visualization on a display with the MOfAI objects.

Embodiments of the invention are particularly suitable for implementation with image display systems allowing for collaborative work for visualization of medical images using a tabletop, touch-controlled display. However, embodiments of the invention can be applicable for any use of a touch-controlled display. Thus, the GUIs are not limited to collaborative work nor medical work or uses. The GUIs can be used for single-user access, tabletop displays, portable displays, laptop and desktop displays, vertical displays, or displays that can be mounted in different orientations (substantially vertical or substantially horizontal).

Embodiments of the present invention are particularly suitable for medical image touch-input/screens or displays that allow navigation of visualizations of volumetric data, such as medical image data sets acquired by an imaging modality, for example, a Computed Tomography scanner.

However, other embodiments are directed to non-medical uses, which can be collaborative or single user uses. For example, industries or technology areas that review visualizations of different (2-D, 3-D or 4-D) image data sets including topographic maps of cities, lands, waters, target areas for surveillance, airports, roadways, air or outer space, security, biometrics or military uses and the like.

Some embodiments are directed to visualization systems that include a display and a circuit configured to provide graphic user interface controls with touch input in communication with the display. The graphic user interface controls including a set of base interactions associated with touch gestures available over substantially an entire viewing area and a plurality of alternate interaction icons that are individually movable over the display via touch gestures by a user touch to allow one or more users to interact with a visualization presented on the display.

The alternate interaction icons can each have a set of alternate interaction choices that appear on the display when a respective icon is touched.

The system may optionally include a patient medical data set in communication with the circuit for visualization on the display.

The system may be configured so that a first position on the display of a respective icon defines a different set of interaction choices from a second position on the display.

The system may be configured so that the alternate interaction icons are configured to simulate physical properties of an object and can be slidably advanced over the display upon a touch gesture simulating a pass.

The alternate interaction icons may be configured to be slidably passed to different users for control of the respective icon and associated set of interaction.

The alternate interaction icons may be configured to simulate a mass and be able to move with a velocity when a touch gesture moves the respective icon with a force and direction.

The alternate interaction icons can be configured so that when one collides or hits another, the movements of the icons are configured to simulate a bounce movement associated with a physical collision.

The GUI controls for the alternate interaction icons can be configured to accept two concurrent touch gestures, one by each of two different hands, one touch gesture selecting the alternate interaction icon, and the other hand to use a touch gesture to select a choice from a generated set of choices of different interactions associated with the selected icon.

The alternative interaction icons can be configured to fade in and out of view on the visualization.

Other embodiments are directed to methods of interacting with image data on a display. The methods include (a) providing a visualization of a data set on at least one display; (b) providing a plurality of independently movable alternate interaction icons on the display that are configured to fade in and out of view; (c) accepting a touch gesture of a user to independently select one of the plurality of alternate interaction icons on a display and to move each of the alternate interaction icons over at least a major portion of a viewing area on the display; and (d) providing a set of alternate interaction options associated with the selected icon or altering a way in which the visualization reacts to a base interaction touch gesture in response to the accepted touch gesture.

The set of alternate interaction options can be different depending on where on the display the selected alternate interaction icon is located.

The method may optionally include allowing one user to slidably transfer one or more of the alternate interaction icons to another user.

The alternate interaction icons can be configured to simulate mass associated with a physical property of an object and the method further includes (virtually) bouncing one icon of another in response to a touch gesture by one user.

The at least one display can be a single display on a horizontal collaborative workstation configured to accommodate a plurality of concurrent users.

The method may include accepting a set of basic interaction touch gestures to zoom, pan and rotate views of the visualization.

The visualization can be a visualization of a patient medical data set.

The accepting step can be carried out using two concurrent touch gestures, one by each of two different hands, one touch gesture selecting the alternate interaction icon, and the other a choice from a generated set of choices of different interactions associated with the selected icon.

Yet other embodiments are directed to computer program products for providing Graphic User Interface controls to visualization systems of image data sets using a touch screen. The computer program product includes a non-transitory computer readable storage medium having computer readable program code embodied in the medium. The computer-readable program code includes: (a) computer readable program code configured to generate a plurality of alternate interaction icons that are independently movable across at least a major portion of the touch screen, each having at least one associated set of interaction choices; and (b) computer readable program code configured to allow one or more users to use a touch gesture to select one of the alternate interaction icons to interact with the visualization and/or alter views of the visualization.

The set of interaction choices for at least one icon can be dependent on where the icon is located.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIGS. 11A-11D are digital images of a basic set of touch gestures used to interact with the visualization on a display according to embodiments of the present invention.

FIG. 12 is an enlarged screen shot of an exemplary movable icon used for alternative touch gesture interaction with a visualization on a display according to some embodiments of the present invention.

FIG. 13 is a digital image of a movable icon allowing alternate interactions using a defined touch gesture according to embodiments of the present invention.

DETAILED DESCRIPTION OF EMBODIMENTS OF THE INVENTION

Figure 1A:
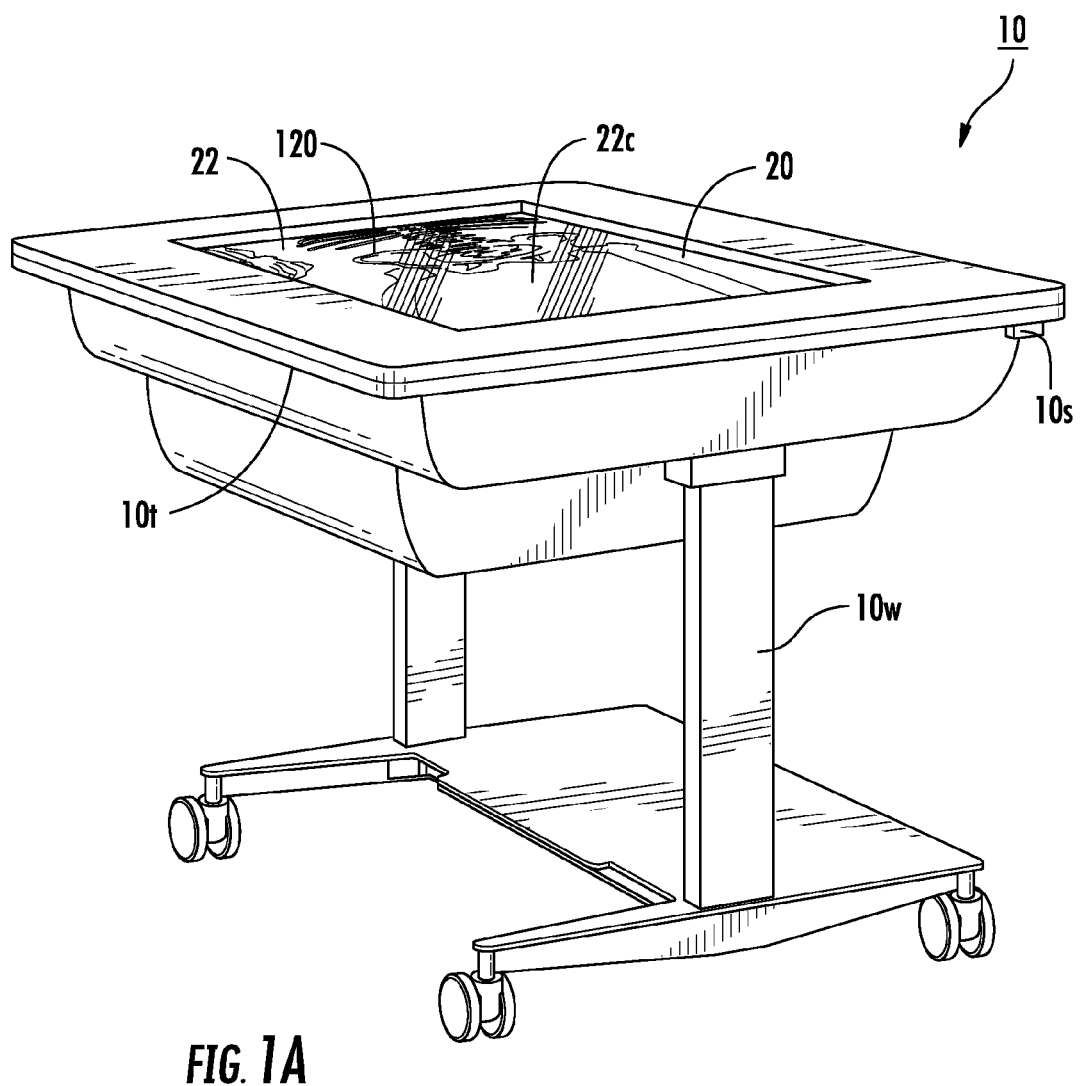
FIG. 1A is a side perspective view of an exemplary workstation with a screen or display with a touch-screen input graphic user interface (GUI) with movable alternate interaction objects according to embodiments of the present invention.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain embodiment, features or operation of one embodiment can apply to others.

In the drawings, the thickness of lines, layers, features, components and/or regions may be exaggerated for clarity and broken lines (such as those shown in circuit or flow diagrams) illustrate optional features or operations, unless specified otherwise. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. Although described or shown with respect to one embodiment, the features so described or shown can apply to other embodiments.

The term "circuit" refers to an entirely software embodiment or an embodiment combining software and hardware aspects, features and/or components (including, for example, at least one processor and software associated therewith embedded therein and/or executable by and/or one or more Application Specific Integrated Circuits (ASICs), for programmatically directing and/or performing certain described actions or method steps). The circuit can reside in one location or multiple locations, it may be integrated into one component or may be distributed, e.g., it may reside entirely in a workstation or single computer, partially in one workstation, cabinet, or computer, or totally in a remote location away from a local display at a workstation. In some embodiments, the GUI controls with the movable objects can allow for multiple users at a single display or multiple users using multiple displays. If the latter, the multiple users can communicate over a LAN, WAN or internet to collaboratively view and interact with the data and other user screens.

The term "visualization" means to present images to a user or users for viewing. The visualization can be in a flat 2-D image and/or in 2-D that appears to be 3-D images on a display, data representing features (physical, electrical or magnetic and the like) with different visual characteristics such as with differing intensity, opacity, color, texture and the like. The actual visualization can be shown on a screen or display so that the volume or region (e.g., map, or topographical or anatomical structure) is in a flat 2-D and/or in 2-D that appears to be 3-D volumetric images with data representing features or electrical output with different visual characteristics such as with differing intensity, opacity, color, texture and the like. A 4-D map can either illustrate a 3-D heart or a structure such as a river with movement or show additional information over a 3-D topographic or anatomic contour or structure.

Embodiments may be particularly suitable for use with medical visualization of images from any imaging modality including MRI and CT. For MRI, the images may optionally be generated using "Direct Volume Rendering" or (DVR). DVR, a term well-known to those of skill in the art, comprises electronically rendering a medical image directly from data sets to thereby display visualizations of target regions of the body, which can include color as well as internal structures, using multi-dimensional 3D, 4D or more dimensional data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs.

The term "automatically" means that the operation can be substantially, and typically entirely, carried out without human or manual input, and is typically programmatically directed or carried out. The term "electronically" includes both wireless and wired connections between components.

The term "clinician" refers to a physician, radiologist, physicist, coroner, medical examiner or forensic pathologist or other personnel desiring to review medical data of a subject which is typically a live human or animal patient, but the subject may be deceased. The term "tissue" means blood, cells, bone and the like.

A data set for the visualizations can be defined as a number of grid points in G dimensions, where there is V number of values in each grid point. The term "multi-dimensional" refers to both components, grid G and variates V, of the data sets. For data sets having a V≥1, the data set is referred to as multi-variate. Examples: a normal medical data set has G=3 and V=1, a normal time-dependent volume has G=4 and V=1, a volume describing flow will have G=3 and V=3 (three values, since the velocity is a 3D vector). The data sets of the instant invention for medical images will typically have G and V values of G≤4 and V≤6. As known to those of skill in the art, traditional medical systems are bound by the 2D slice format used by the imaging modalities and use this base to construct higher-dimensional data.

Figure 1B:
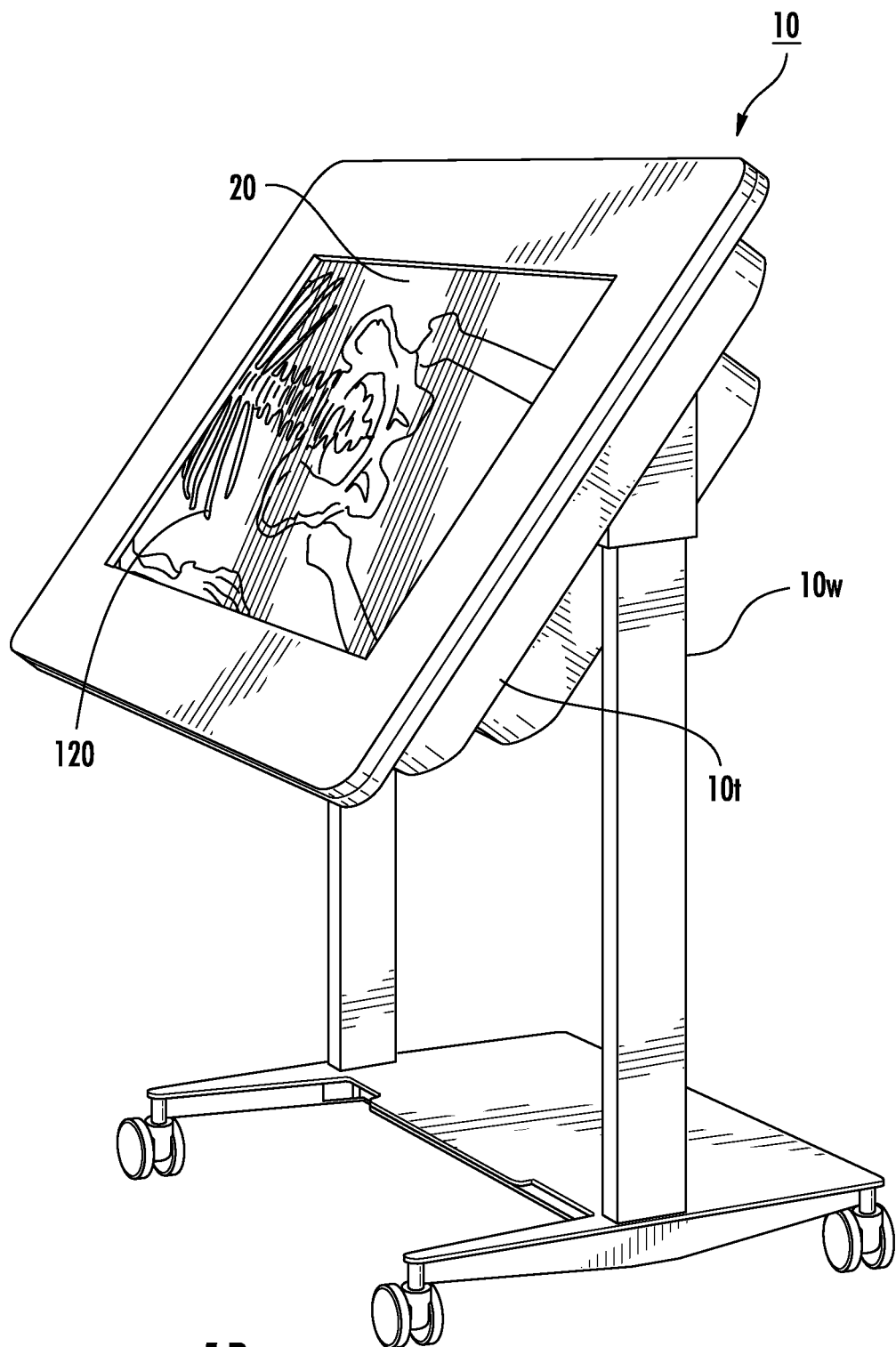
FIGS. 1B and 1C are side perspective views of alternate orientations of the display shown in FIG. 1A according to embodiments of the present invention.
Figure 1C:
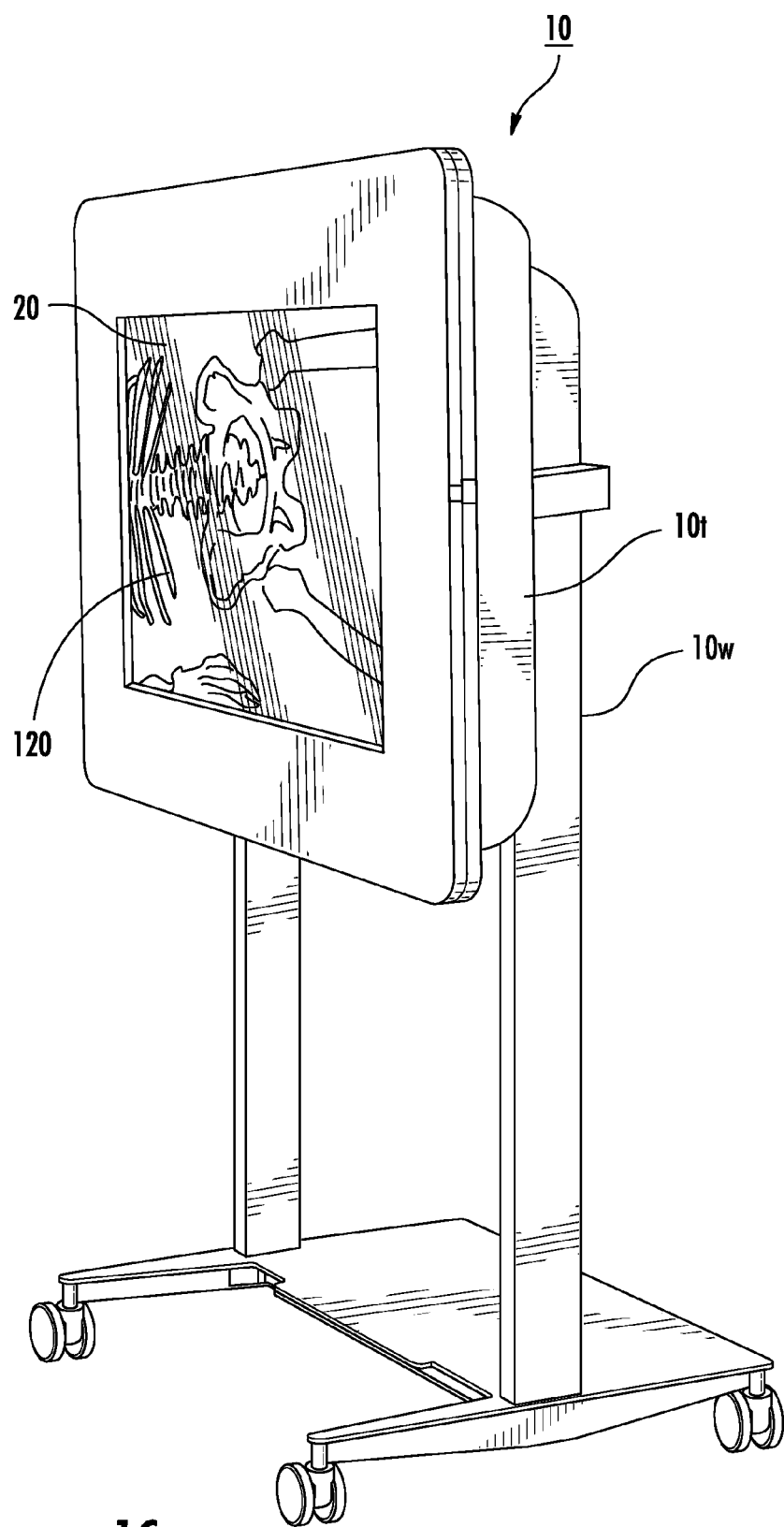

Turning now to FIG. 1A, a visualization system 10 with a display or screen 20 is illustrated with a visualization of a target object and/or place 120 (shown as a medical visualization of a torso/upper legs of a human). It is noted that the terms "display" and "screen" are used interchangeably. As shown, the display 20 is held on a workstation base that orients the display 20 in a substantially horizontal orientation. The display 20 may be affixed in this orientation or may be configured to tilt or pivot up and down. FIGS. 1B and 1C illustrate the system 10 can be configured as a tiltable table with the screen 20 able to tilt to various non-horizontal angular orientations including a vertical orientation (FIG. 1C).

Figure 2:
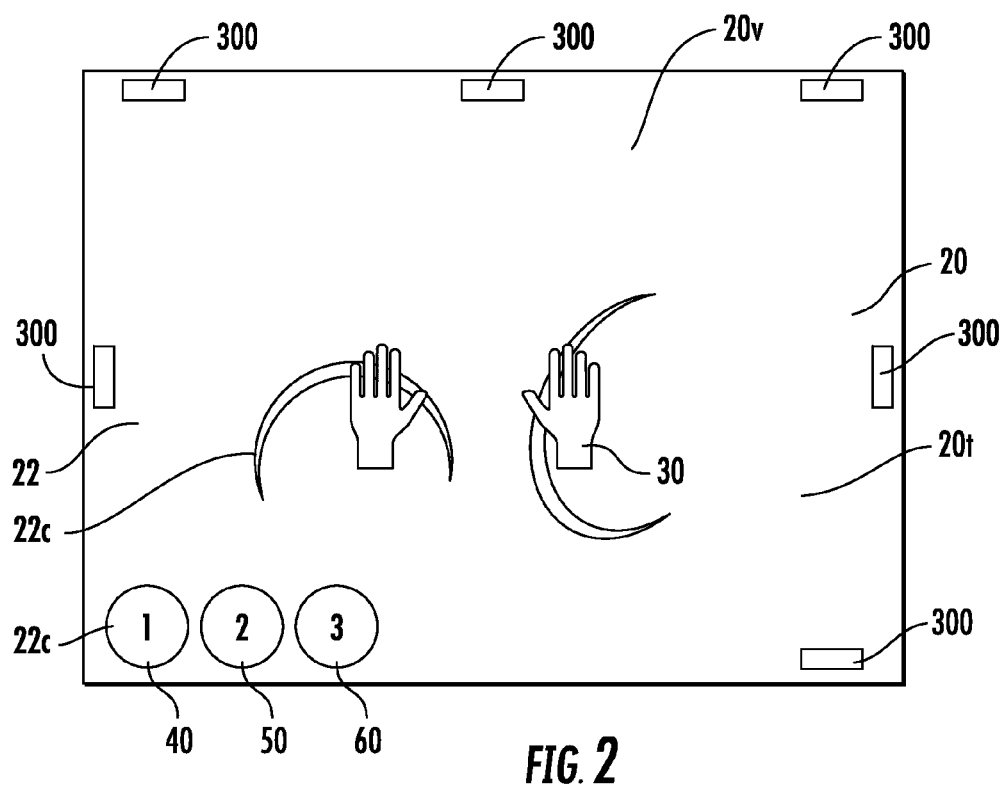
FIG. 2 is a schematic illustration of a screen or display with a touch-screen input having a GUI that includes a set of base touch gesture interactions and a plurality of movable interaction objects or icons that provide intuitive and alternate interaction choices according to embodiments of the present invention.

The display 20 can include a touch-input/touch-screen 20t with a GUI 22 with a plurality of controls 22c including basic touch gestures 30 and movable icons 40, 50, 60 (FIG. 2). The term "icon" refers to an object that represents a tool or action that can be accessed to alter a viewing parameter or view of a visualization on the display 20. The icons 30, 40, 50 can include a defined physical shape with a graphic element or elements that represents actions that can be accessed via that object when activated. The graphic element or elements can comprise a pictogram which may be in color. The display 20 may also or alternatively be held on a laptop, desktop or a workstation that holds the display in any appropriate orientation, e.g., vertical or angled. The GUI controls 22c can be configured to operate irrespective of the type of display or orientation of the display.

FIG. 2 illustrates that the GUI controls 22c can include a base interaction setting 30 with a first set of touch gestures 30 that are useable over substantially the entire viewing (visualization) area 20v. To be clear, the "swipe marks" or curves shown in FIG. 2 with respect to the touch gesture inputs for some base interaction GUI controls 22c are shown merely to illustrate the touch screen 20 and GUI 22 has an interactive screen with the base interactions 30 available for any arbitrary position on the image itself, without requiring any visual object controls to activate or access them. Rather, a user can use a touch gesture associated with a base interaction set of touch gestures at any desired location on an image as shown.

As also shown, the GUI controls 22c also includes movable icons 40, 50, 60 that provide intuitive alternative interactions selectable by a user.

The movable icons 40, 50, 60 can be described as Movable Objects for Alternate Interaction, "MOfAI". In some embodiments, all features (degrees of freedom) available in GUI software designed for touch input can be made instantly available to one or several users no matter if the display device is mounted in a horizontal or vertical position. The flexible nature of these icons or objects 40, 50, 60 allows all participants of a collaborative session to take an active part in the interaction. At the same time, all participants can easily visually follow and understand how the current user(s) are interacting with the visualizations using the icons or objects 40, 50, 60.

As shown in FIG. 2, the GUI controls 22c provides a set of base interactions 30 which is typically available and triggered by default in any part of the display area as soon as any user gives touch input. The base interaction 30 can include, for example, a set of commonly used touch gestures such as swiping, tapping, pinching and un-pinching. For medical visualization uses, the base interaction set 30 typically allows the users to pan, rotate and zoom the dataset, providing at least six (6), and in some embodiments, seven (7) degrees of freedom (DOF). FIG. 2 shows that the base interaction set 30 is available in substantially the entire visualization area (e.g., across at least 90% of the screen or display). As also shown, three "faded" icons 40, 50, 60, e.g., MOfAIs denoted "1", "2" and "3," are aligned in the bottom-left of the visualization area.

In some embodiments, the alternate mode is "silent" and there are no new GUI controls or options showing up on the screen, it simply changes the way the visualization reacts to one of the basic interaction touch gestures, for instance, a swipe across the image.

FIG. 2 also illustrates that the visualization system 10 (e.g., table) can include a plurality of spaced apart infrared sensors 300 located proximate to but above the screen 20 to facilitate the touch interaction control of the displayed features. The locations and numbers of sensors 300 are merely by way of example and other infrared sensor configurations can be used. It is believed that infrared sensors 300 are well suited to various lighting environments and and allow the use of gloves in healthcare or forensic environments. However, other and/or additional types of touch gesture sensors and inputs can be used such as, for example, camera-based systems detecting touch gestures optically through the screen 20 with calibration sufficient to provide the desired responsiveness, pressure sensors, motion sensors and the like.

Figure 3:
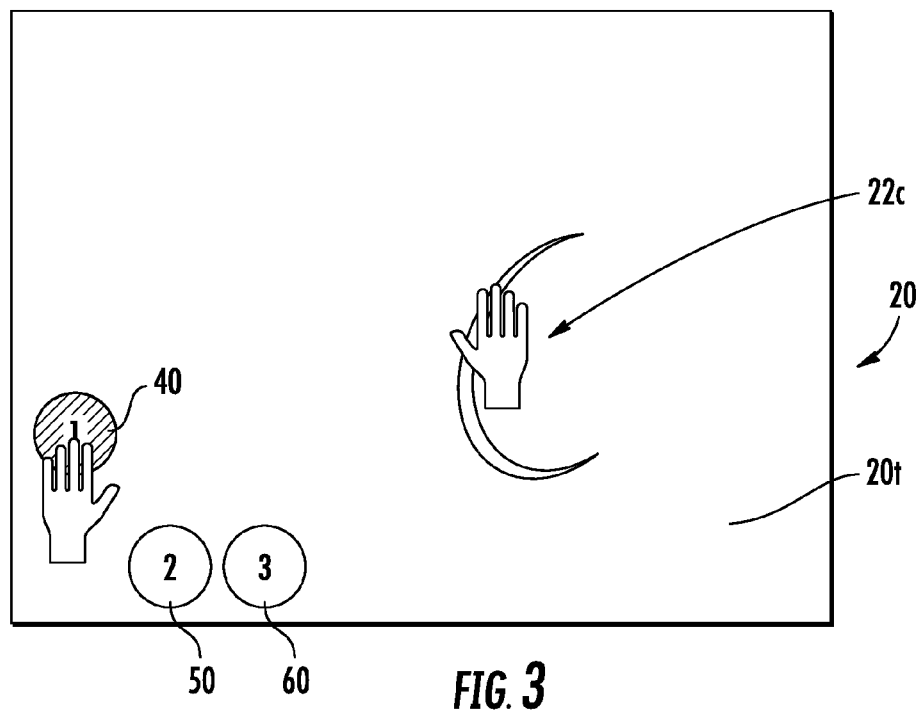
FIG. 3 is a schematic illustration of the GUI shown in FIG. 2 illustrating a concurrent dual-touch input according to embodiments of the present invention.
Figure 4:
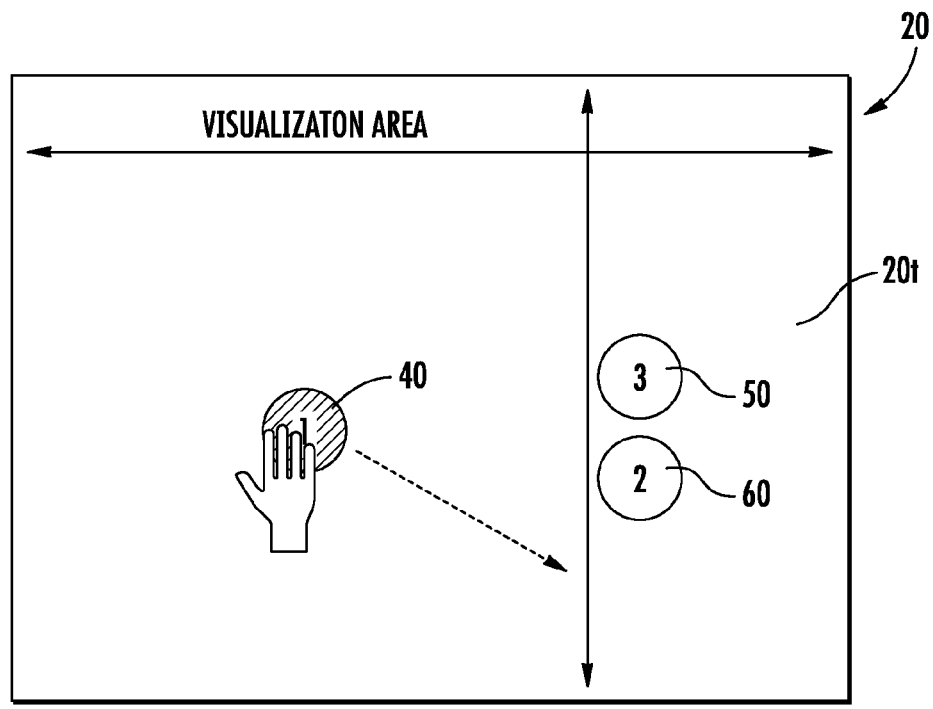
FIG. 4 is a schematic illustration of the GUI shown in FIG. 2 illustrating that the movable icons are mobile and can be virtually moved over the viewing area (and faded out/in) according to embodiments of the present invention.
Figure 6:
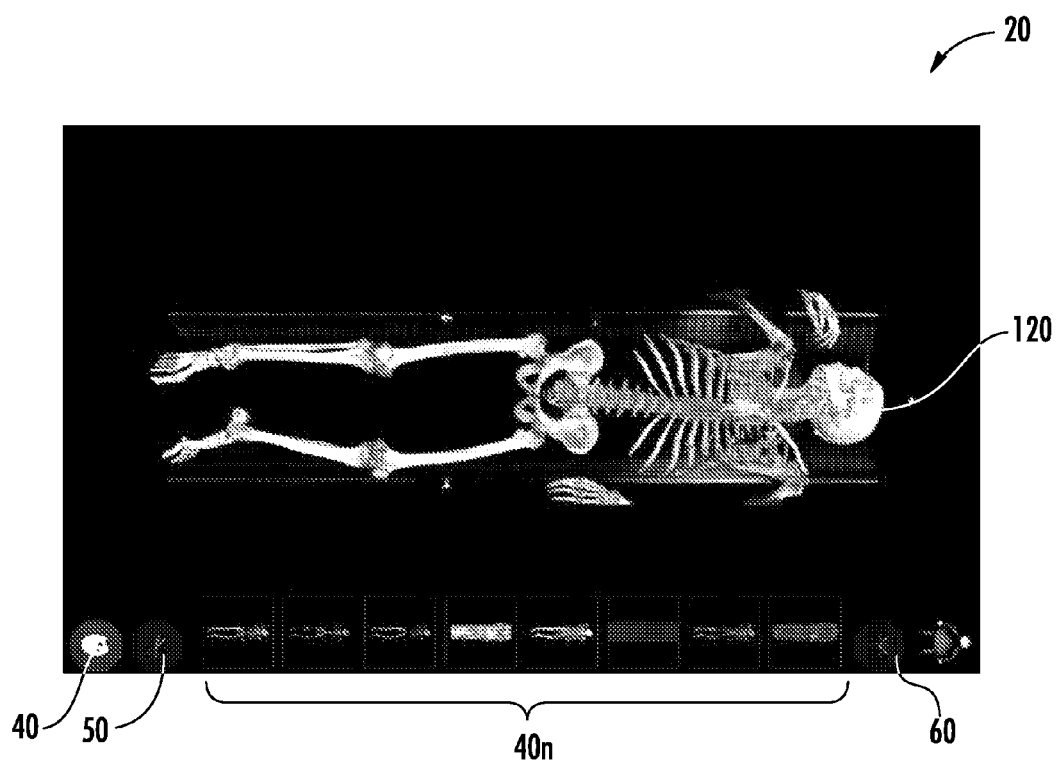
FIGS. 6-8 are screen shots of an exemplary display with examples of movable interaction objects used with medical visualizations according to embodiments of the present invention.

FIG. 3 illustrates that when a user touches and selects the icon 40, it can darken or otherwise visually increase in intensity and/or color to show that the icon 40 is active while the other alternate icons 50, 60 remain faded or less visually dominant. FIGS. 3 and 4 also show that the icon 40 can be moved over the visualization using a touch gesture. FIG. 6 illustrates that activation or touch of the icon 40 can reveal a number of interaction choices 40n associated with that icon.

In some embodiments, as shown by the two hands on the screen 20 in FIG. 2, the GUI control 22c can be configured to accept concurrent (two hand) input. The alternate interaction set 40 associated with icon 40 can be activated by the right hand while the desired interaction or viewing alteration can be selected using the right hand and an associated touch gesture (or vice versa). That is, to provide more degrees of freedom, the GUI controls 22c can require two touch inputs where a user typically uses one hand to touch the object/icon of choice (here shown as icon 40) and thus activate the alternate interaction features. The other hand can be used to perform the desired interaction. By releasing the icon 40 (even at the moved location), a user can continue interacting using the base interaction set 30. The term "extended DOF set" can be used to describe the combination of the base interaction and the additional interaction provided by the movable icons 40, 50, 60. The extended DOF set is typically much larger than 7 DOF, typically between about 15-50 DOF.

The icons 40, 50, 60 can be designed with a size that makes them easy to touch, even if they only appear peripherally to the user. The icons 40, 50, 60 are typically selectively and independently mobile and the GUI controls 22c allow them to be passed between the participants of a collaborative team or moved to a location on the display/visualization that is desired or indicated as relevant to a review of the dataset. Although shown as three movable icons 40, 50, 60, one, two, three or more than three icons may also be provided/used. The GUI controls 22c can be configured so that the image visualized is not occluded by the icon/icons 40, 50, 60. Unlike conventional software graphical elements such as frames and toolbars which are typically a fixed part of the user interface, the movable icons 40, 50, 60 are not only movable, which makes it possible to freely move them away from an area where they are occluding the displayed data, they can also fade in/fade out depending on the user's intent to use one or more of them. This flexibility maximizes the display area, and can be configured so that at all times, a user(s) can focus on the visualization rather than the user interface.

Figure 5:
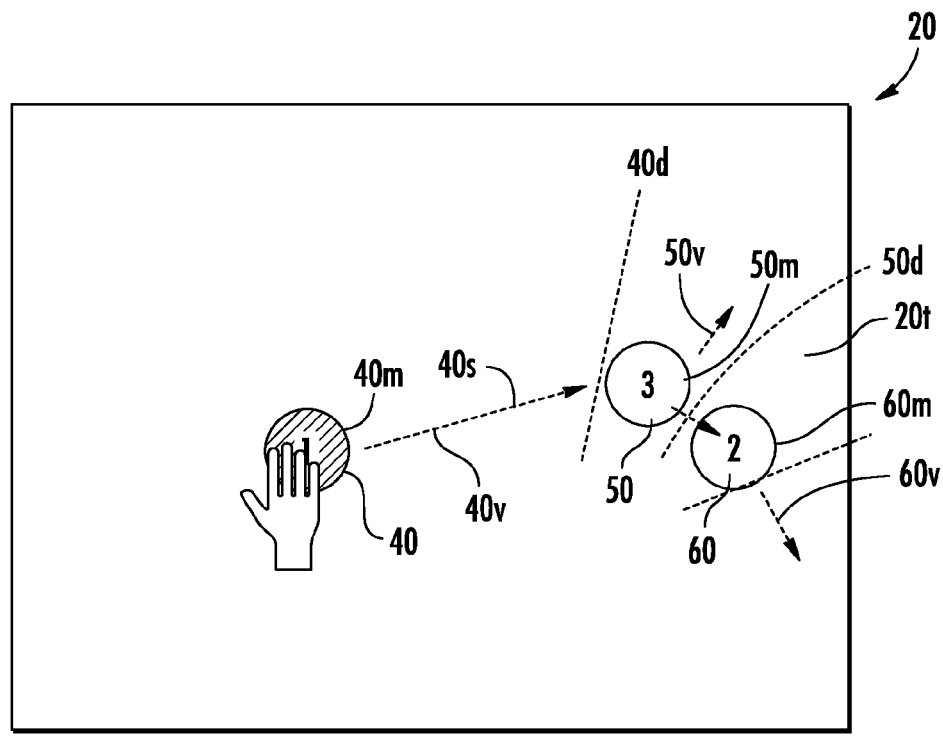
FIG. 5 is a schematic illustration of the GUI shown in FIG. 2 illustrating that the icons can be configured to have physical properties that allow for, inter alia, slidably "passing" an object or objects to another user, with optional collision detection and/or reactive movement between icons according to embodiments of the present invention.
Figure 7:
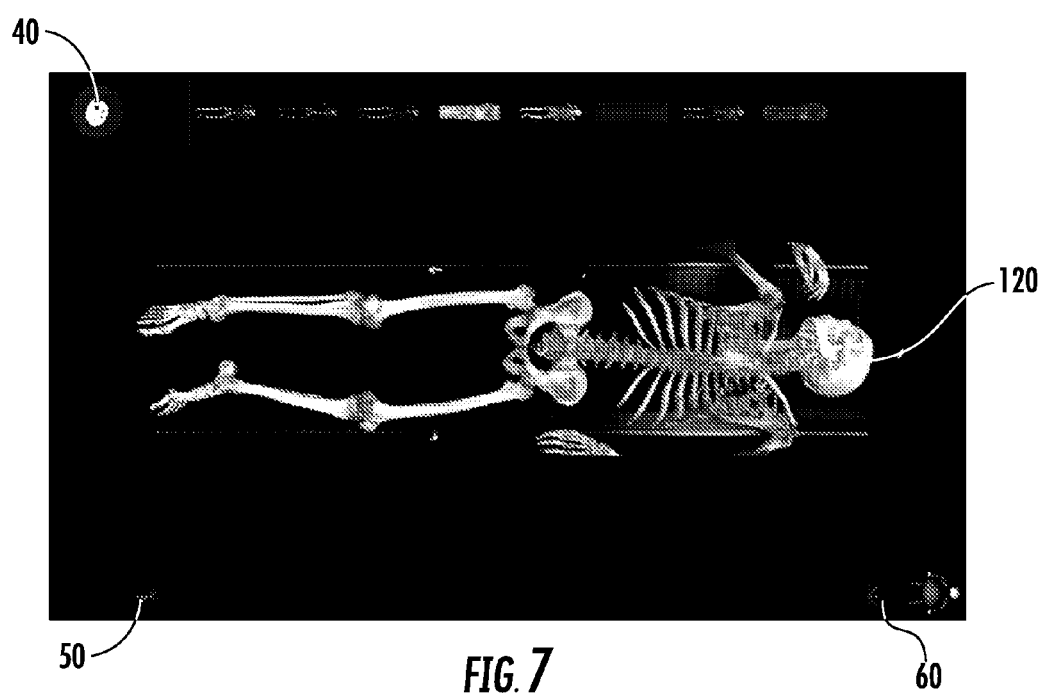

The fade features and the movable nature of the icons are such that the icons 40, 50, 60 do not occlude important structures or features of the dataset while still providing accessibility for use at all times (FIGS. 4, 5). The icons 40, 50, 60 can have the same or different shapes. As shown, the icons 40, 50, 60 have disc or puck shapes. When not in use, the icons 40, 50, 60 can be docked at a common location (FIG. 2), typically along a perimeter. Alternatively, the icons 40, 50, 60 can be docked at different perimeter locations of the visualization/display 30 as shown in FIG. 7.

FIG. 4 again shows that the movable icons 40, 50, 60 are individually mobile and can be placed at any location in the visualization area. The GUI controls 22c can be configured to fade out/make transparent any icon 50, 60 objects not currently being placed over the visualization, not currently in use, or in position and in use but faded to provide as much focus on the visualized data as possible.

As shown in FIG. 5, the icons 40, 50, 60 can be configured to act like physical (tangible) objects. The icons 40, 50, 60 can be configured to simulate physical properties. The GUI software (e.g., GUI control circuit) can, for instance, electronically configure the icons 40, 50, 90 to have a virtual mass and configure them to be affected by virtual friction, which makes them behave as real objects, e.g., pucks sliding across a real table when they slide across the screen. If desired, virtual force fields can be present to simulate the descending of an object due to gravity (especially intuitive for upright displays) or topology (for instance, to make an object slide toward the closest table edge as if there were a hill or high point in the middle of the screen). In some embodiments, if the icons 40, 50, 60 collide they can bounce off of each other as physical objects, e.g., pucks do.

In some embodiments, the GUI controls 22c are configured to monitor data associated with physical sensors on the display/workstation that identify screen orientation, such as, for example, whether the screen is held vertical, horizontal or held at another angle. This information can be used to adjust the physical or motion properties used by the GUI controls, e.g., the icons 40, 50, 60 can move with corresponding gravitational forces, kinetic and potential energy based on the actual orientation of the display 20. Thus, the display 20 and/or workstation 10w can include optional angle sensors 10s (FIG. 1A).

When the display 20 is in a vertical orientation the icons may slide to a bottom of the screen per gravity unless docked or locked into a position.

FIG. 5 illustrates that the GUI controls 22c can be configured so that the electronically defined "virtual" physical properties (e.g., mass) 40m, 50m, 60m of the MOfAIs 40, 50, 60 interact with each other, such as allowing collision detection and/or proximity detectors 40d, 50d that allow the respective icons 40, 50, 60 to move along associated vector trajectories 40v, 50v, 60v when one hits another with a certain "speed" or velocity 40v, 50v, which can contribute to the intuitiveness of the MofAI controls 40, 50, 60.

The MOfAI icons 40, 50, 60 can be configured so that the position of the alternative interaction object can electronically adjust to provide variants of the alternative interaction it can provide. It is noted that interacting is not limited to the "owner" of the interaction object 40, 50, 60 since these GUI controls merely control when to use the alternate interaction feature. The MOfAI icons 40, 50, 60 can provide extra dimensions to a touch-based GUI. Depending on the application and implementation (e.g., single user or collaborative workstation or display), the MOfAI can be configured to provide an intuitive and direct way of interacting with the provided extended DOF set. In some embodiments, all participants are given close access to an extended DOF set in an application.

In contrast, without MOfAI, an extended DOF set is typically achieved through a more static mode-based approach where the other mode is accessed by for instance pressing a button. The other mode is active until a button is again pressed. There are two disadvantages with the static approach compared to the MOfAI approach, where the mode is typically only active while the MOfAI is being touched. One is that in the static approach some users in the collaboration may become uncertain of which mode is active. The other is that advanced interaction having several simultaneous inputs from different users can be confusing and ineffective. In comparison, the benefits of the MOfAI approach include one or more of the aspects described below.

When using MOfAI, it is clear to a collaborative group what type of interaction the currently interacting user(s) provide. The MOfAI adds clarity to a collaboration by providing a way to restrict advanced interaction to being used by one person at a time. It is clear for all users that the user "holding" the MOfAI is currently in control. At the same time it is very easy and intuitive to pass on the control by passing on the MOfAI to another user. The number of degrees of freedom is only limited by the acceptable number of MOfAI icons. It is reasonable to expect that the base interaction when dealing with medical datasets provides about 6 or 7 degrees of freedom (xyz-Pan, xyz-Rotate and uniform zoom). In addition, a number of MOfAIs would be possible to add without interfering with the intuitiveness of the GUI software, typically up to about 6 objects. This may be dependent on the size of the visualization area as well as the size of the icons associated with the MOfAIs.

The fade features and their movable nature prevent the MOfAIs from occluding important structures of the dataset still providing accessibility at all times (FIG. 2-5). This maximizes the effective display area at all times, allowing the users to focus on the visualization and not on the user interface. It is believed that these benefits are not provided by traditional software graphical elements. Also, the specialized interaction, which is more difficult to understand than the base interaction, is inhibited from being used by mistake, although it is directly available with the usage of a MOfAI icon 40, 50, 60. The icons 40, 50, 60 are well-suited for both left-handed and right-handed users since the objects can be placed at the desired location at all times.

Figure 8:
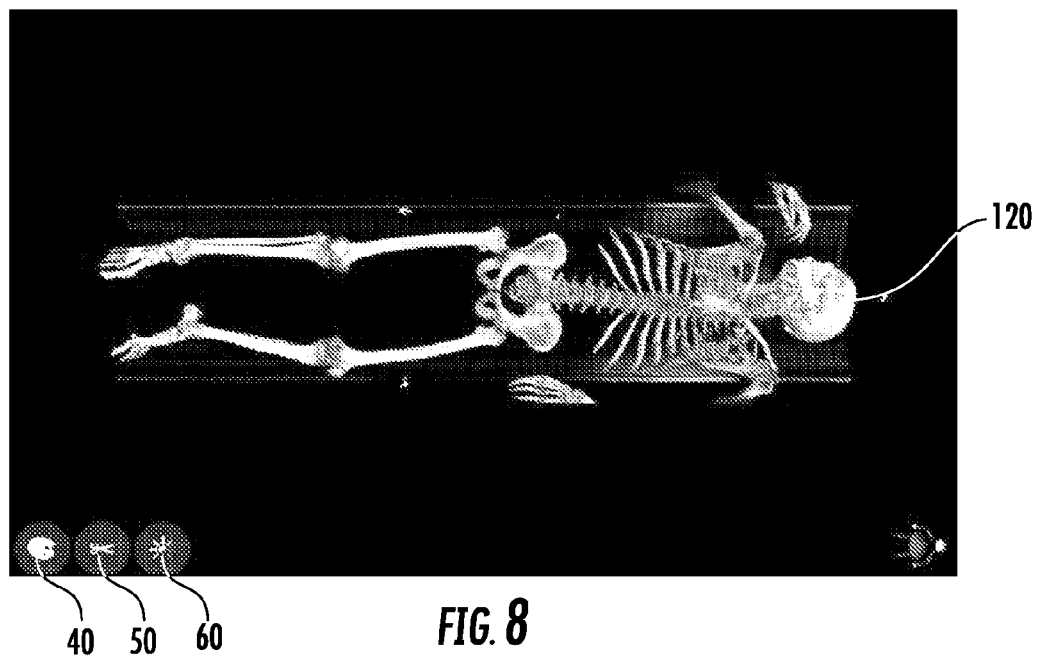

FIGS. 6-8 illustrate an example of a display 20 that provides a visualization 120 of a patient medical data set. The display 20 may be held by a collaborative workstation 10w that is sufficiently large to allow several different users to access the icons 40, 50, 60. However, the workstation may be a single-user station as well. Icon 40 is an MOfAI icon that includes a paint pallette pictogram on a puck shape. Touch-selecting this icon 40 reveals alternate interaction viewing choices 40n (shown as 8 different choices regarding ways to alter the image data). Icon 50 is an MOfAI icon that includes a scissors pictogram and has a puck shape. Icon 60 is an MOfAI icon that includes a sun pictogram in a puck shape, the sun shown with half of its shape as a partially faded pictogram.

FIG. 6 shows the MOfAI icons for medical dataset visualization where the icon 40 provides a possibility to apply default color presets and is positioned in the lower part of the visualization area. When touched, the icon 40 presents a list of available presets 40n in the same area. FIG. 7 shows icon 40 positioned in the upper part of the visualization area, activated so as to present the list of available presets 40n in the same part. FIG. 8 is an example of the icons 40, 50, 60 docked along one edge of the display 10.

In some embodiments, the system 10 is a visualization table 10t with at least one, and typically all, of the below listed features:

(i) intuitive basic interactions whereby the learning threshold for a user to be able to understand and use basic interaction is minimal;

(ii) advanced interaction is available without disturbing the ease-of-use of the basic interactions;

(iii) for medical or forensic visualization uses, users can experience similarity with real-world situations in patient care;

(iv) user touch gesture interaction can be highly responsive and robust;

(v) user interaction can be equally intuitive for all positions around the table;

(vi) swift but visually apparent, distinct changes of which person is currently interacting with the display is provided; and (vii) the system can be robust to work in versatile environments without recurring maintenance efforts.

Figure 9:
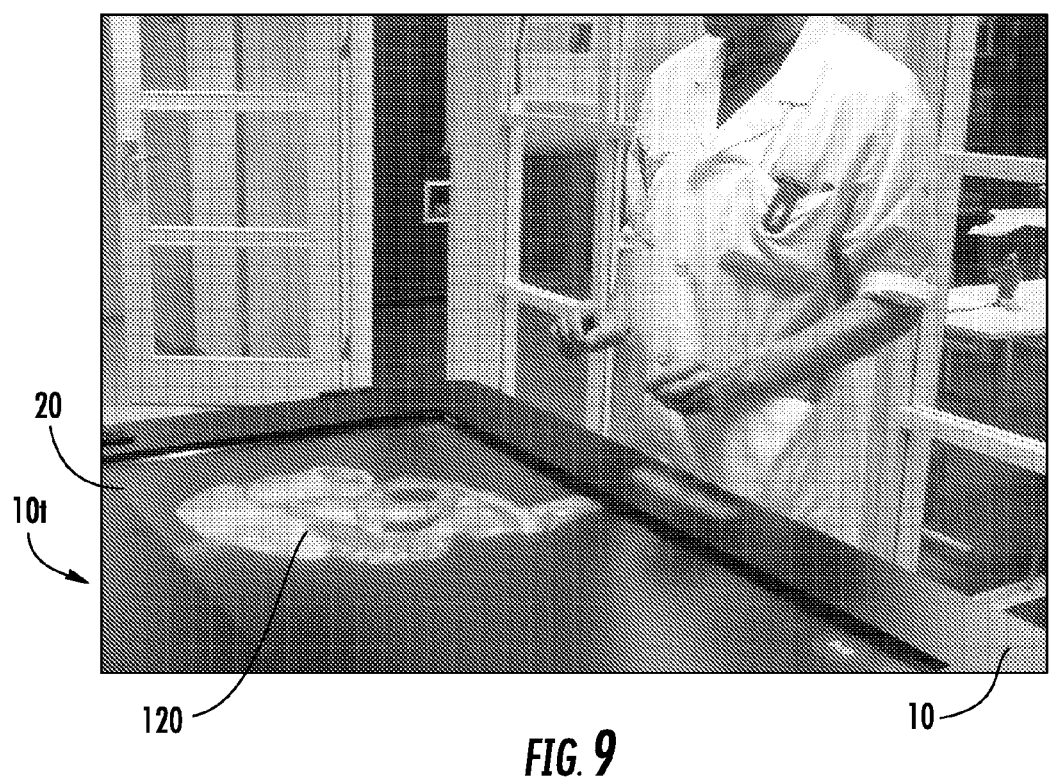
FIG. 9 is a digital photograph of an exemplary medical visualization table according to some embodiments of the present invention.
Figure 10:
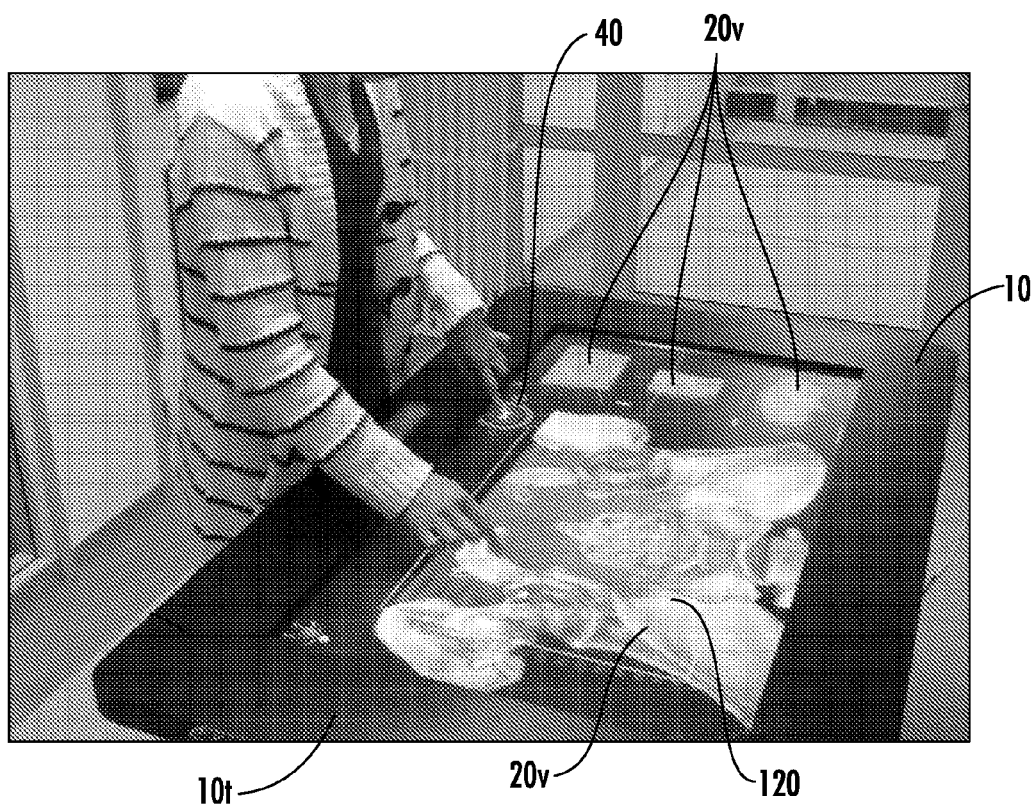
FIG. 10 is a digital photograph of the table shown in FIG. 9 illustrating user interaction of a visualization with touch gestures and a movable icon according to embodiments of the present invention.

In particular embodiments, as shown in FIGS. 9 and 10, the system 10 comprises a table 10t that is sized to allow a user to experience a presentation substantially equivalent to "a patient on a table". Thus, the table 10t can hold a relatively large screen 20, such as between about 30-100 inches (measured on the diagonal), typically between about 40-80 inches, and more typically about 46 inches. The resolution may be any suitable resolution for the intended purpose, but is typically at about 1920×1080 p resolution. As shown in FIGS. 9 and 10, the table 10t can allow horizontal display. However, the table 10t may also allow for vertical display (and/or screen storage) to provide more versatility in terms of usage scenarios since it would be visible from a larger distance and/or be less space consuming (FIG. 1C).

As shown in FIGS. 9 and 10, for example, the operational interaction intuitiveness of the system 10 can be enhanced by the touch gesture technology and also by configuring a target image, e.g., a medical image, to visually primarily dominate substantially the entire screen area. In some embodiments, there are no menus or toolbars visible on the screen at any one time and only a few other GUI elements. This clean design can attract user interest and interaction with the system.

Perspective projection with a fixed angle can be used in some embodiments. On demand, the user can launch a set of browsable Multiplanar Reconstruction (MPR) views showing the three main orientations (FIG. 10, left side of screen 20).

In particular embodiments, the system 10 can operate using volume rendering software that may be on-board the table 10t or may reside totally or partially in a remote component (e.g., server, computer or the like). The volume rendering module can include GPU-based raycasting that includes Direct 3D version 10 and high-end off-the-shelf graphic boards. Of course, custom modules and hardware may optionally be used. Data can optionally be processed in texture blocks, sized $512^3$ at maximum. Textures can overlap by one voxel to facilate hardware-accelerated trilinear interpolation. As known to those of skill in the art, acceleration based on empty-space skipping may optionally be employed, based on block geometries. See, e.g., H. Scharsach, Advanced GPU Raycasting, In Central European Seminar on Computer Graphics, pp. 69-76 (2005), the contents of which are hereby incorporated by reference as if recited in full herein.

In some embodiments, the system 10 can have a default configuration where the rendering engine maintains a fixed high frame rate (25 fps) and reduces the rendering quality if necessary. Quality reduction is achieved by increasing the sample step size along the ray, whereas the ray density can always be one ray per screen pixel. At full quality, the rate can be 2.5 samples per voxel and a typical interaction quality corresponds to 1.33 samples per voxel. In a representative scenario, a data set of 512×512×1895 voxels can be rendered in a 1920×1080 viewport with 1.33 samples per voxel on an nVidia GeForce GTX580. Using the typical transfer function, the system 10 can achieve a frame rate of 23 fps.

Figure 11A:
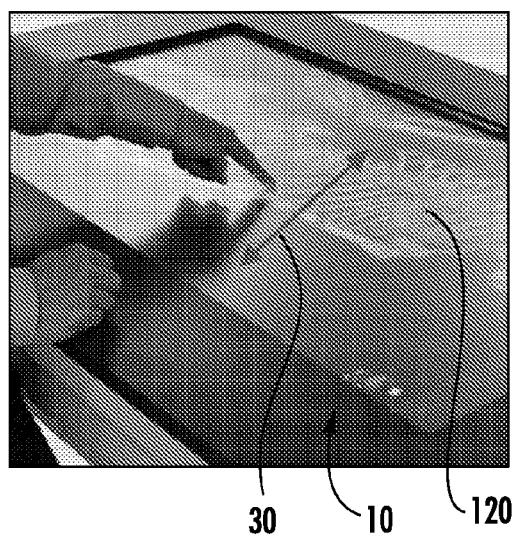
Figure 11B:
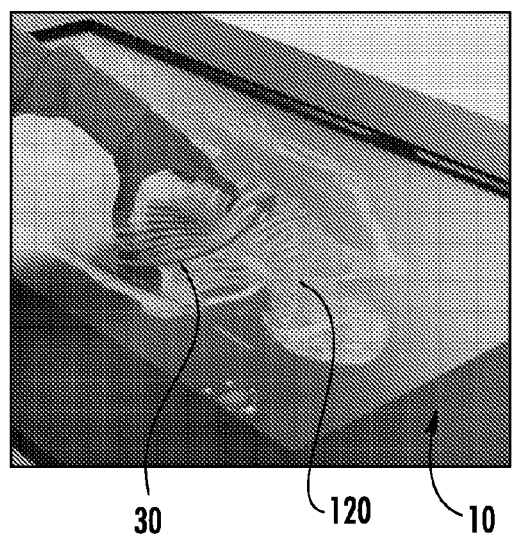

Referring to FIGS. 11A-11D, examples of a basic set of touch gestures that can be used to provide 6 DOF, including x-y pan, x-y-z rotation and zoom, through a combination of one- and two-finger interactions in a 2 DOF touch input to the screen are shown. FIG. 11A illustrates a touch gesture for rotation about x and y axis with a single finger. FIG. 11B shows rotation about the z-axis with two fingers. FIG. 11C shows panning in the x-y plane with two fingers. FIG. 11D shows zooming with a two finger pinch. In some embodiments, the rotation around x- and y-axes is connected to a single-touch movement and is relative to a global reference point. The reference point can be default set to the middle of the volume. The user can also explicitly define the (global) reference point through a double touch, which selects the closest visible point of the volume corresponding to the screen position. A fixed mapping of input movement to amount of rotation can be used, typically set at 0.2 degrees per screen pixel.

The other DOFs are rotate-scale-translate (RST) interactions achieved by two-touch pinching, which for 2D is well known in many touch applications. Rotation around the z-axis is connected to the angular movement of the directed line between the two touch points. The rotation axis can be set at the midpoint between the touch points, referred to as the "touch midpoint". Panning in the x-y-plane can be determined by the xy movement of the touch midpoint. Where a perspective model is used for the visualization, it may be appropriate and/or even necessary to identify a depth for which the panning movement is equal to the input movement. This can be defined as the closest visible point at the z-axis of the touch midpoint. Finally, the distance between the touch points determines the zoom factor, changing the distance corresponds to changing the zoom with the same factor. The three "two-point" gestures can be available simultaneously, which can provide a sense of direct and complete control and a typical actual two-point gesture can invoke all three interactions to some extent.

For an advanced visualization application such as the medical visualization table 10t, the number of intuitive touch gestures can be less than the number of desired features. A solution that has proven effective in the past is to let a limited set of base features be directly available to the user whereas the remaining features are available after additional activation, still through straightforward touch gestures. Yu et al employed frame areas for activation. See, e.g., Yu et al., F13D: Direct-touch interaction for the exploration of 3D scientific visualizations spaces, IEEE Transactions on Visualization and Computer Graphics, 16(6): 1613-1622 (2010). However, one drawback with such an approach is that the area for unobscured view of the rendered image is decreased. Furthermore, with several frame areas representing different feature sets it is difficult to provide equal access to the tools at every position around the table.

As discussed above, in some embodiments (that are particularly suitable for tables that allow multiple concurrent users for collaborative evaluations/discussion), which address the challenge of supporting a large feature set, the visuzalitation systems 10 can employ at least one movable alternate interaction icon 40, 50, 60. These icons can be referred to as "pucks" due to their round shape and behaviour as noted above. The icons 40, 50, 60 (e.g., pucks) can activate specific feature sets. For example, in one embodiment, Transfer Function ("TF") adjustment, TF preset selection, and clip plane interaction can be activated by one or more icons 40, 50, 60 (e.g., pucks). In operation, a user touches and holds the icon (puck) with one hand and performs the desired interaction with the other hand, see, for example, FIG. 3. As soon as the icon/puck 40 is released the base touch interaction features 30 are again available.

The mobility of the icons 40, 50, 60 allows equal access for all table users. Where the icons are configured with a substantially round shape, the shape can provide a "rotationally invariant" design available for TF selection and clip plane thickness, as shown in FIG. 12. In this embodiment, the icon 40 is shown with thumbnails representing TF presets that can be optionally presented in a radial layout (circumferentially spaced apart). Browsing and focusing on thumbnails can be carried out through a single-finger touch. The clip plane thickness cab be set by the diameter of a circle 41 around the icon 40 (FIG. 13).

An additional advantage of the moveable icon approach in the collaborative context is that all users know which person in the group that is currently in control. The result is that for the base features 30, such as rotation, everybody can interact and when more advanced features accessible via one or more of the icons 40, 50, 60, such as clip planes, are being used a single person can take the lead to interact and it is clear to other users at the table who that is is.

As discussed above, in some embodiments "passing" on the control to another user can be carried out by virtually sliding the icon across the display 20 to another user, like a hand-off of a baton in a relay race. This interaction between users is an effective way of handling interference between collaborators. For increased realism, the icons can be subjected to a virtual friction as they slide and collisions can are handled according to the laws of physics. As also discussed above, when the table 10t is in vertical orientation, a gravity force can optionally be virtually/electronically simulated and/or applied to pull the icons downward. In some embodiments virtual locks or an alternate "docking location" can be used to place them otherwise.

In some particular embodiments, particularly suitable for clinical or forensic situations with a real subject/patient, the visualization data, e.g., the patient data can be displayed substantially in natural size to increase the "the experience of realism." The volume rendering can use a camera model for perspective projection in order to achieve optimal or improved depth cues. Using perspective projection means, however, that the concept of natural size is undefined since the size depiction depends on the depth position. Alternatively, embodiments of the invention can allow the user to define which part of the data that the natural size calibration should be performed on.

Figure 14:
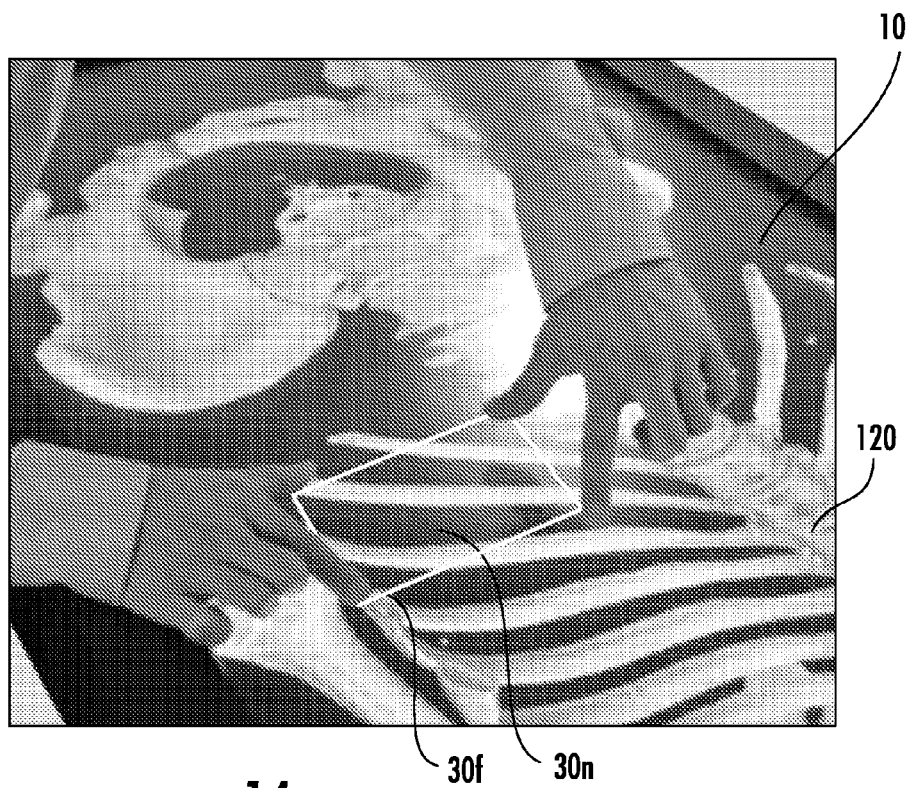
FIG. 14 is a digital image of a touch gesture that can be used to frame a normal size view of a target region of the visualization on the display according to some embodiments of the present invention.

To apply natural size magnification the user selects a region of interest 30n (for natural size viewing) (ROI) as shown in FIG. 14. The touch gesture used to command this natural size view can be carried out using four fingers representing the corners of a rectangle. The gesture thus acts both as an activation of the natural size command and as the definition of the ROI. In case the four positions significantly deviate from a rectangular shape (e.g., two closely spaced substantially "L" shaped finger touch gesture), the natural size command is not activated, which allows for other four-point gestures to be available simultaneously. As an indication that the natural size gesture has been recognized, the system 10 can display a corresponding rectangle frame 30f on the display.

Figure 15:
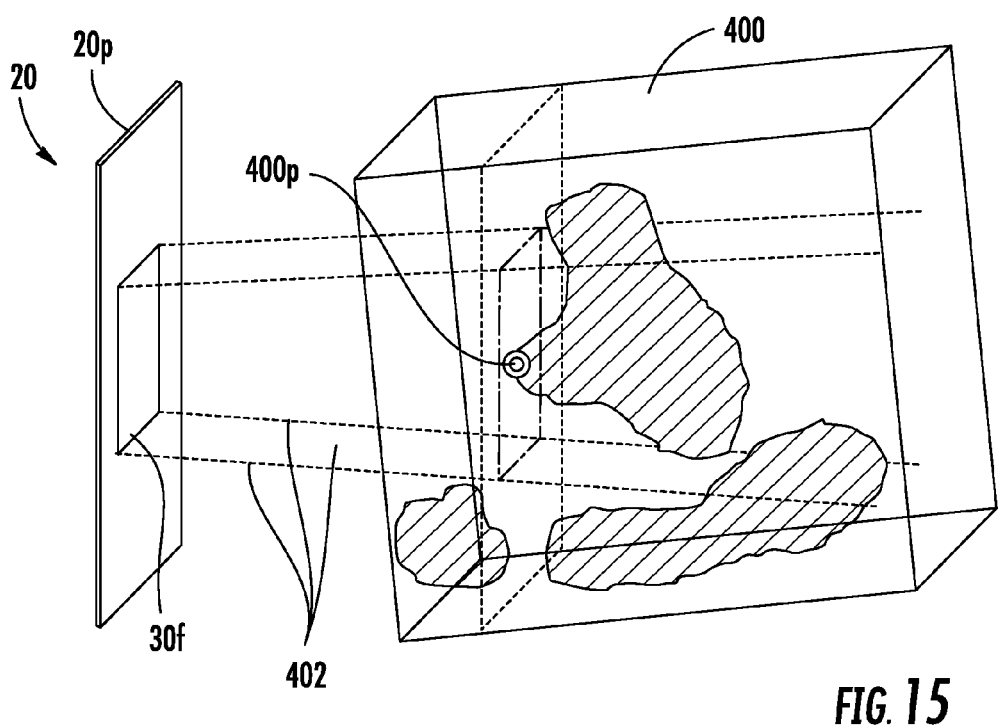
FIG. 15 is a schematic illustration of a calibrated natural size view of a target region of interest that can be shown in a visualization according to embodiments of the present invention.
Figure 16:
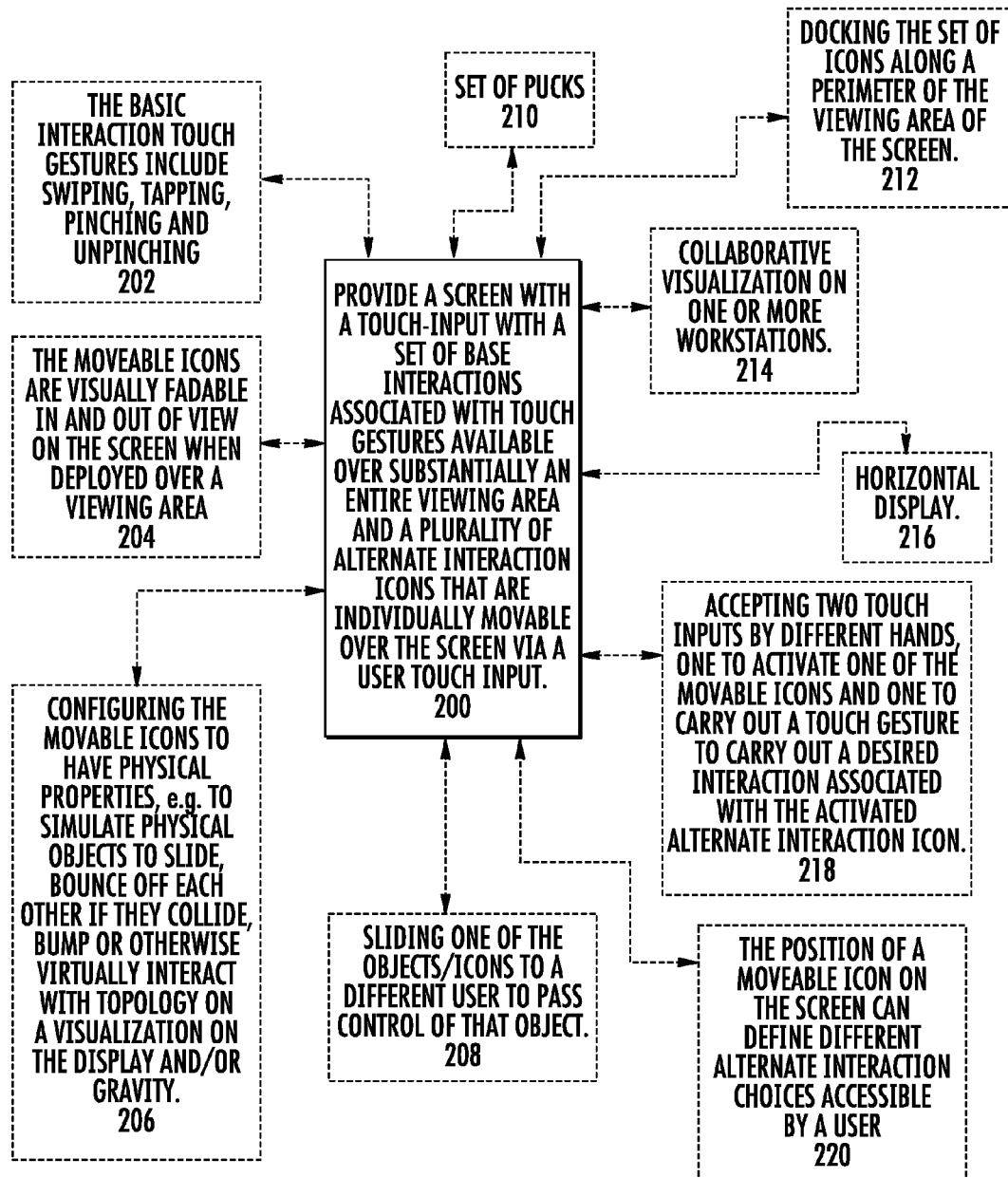
FIG. 16 is a block diagram of exemplary operations and/or features that can be used to carry out embodiments of the present invention.

The system 10 then analyzes the content of selected ROI along the full depth in the virtual projection model. Referring to FIG. 15, a depth map 400 of visible (having non-transparent TF mapping) points is collected. From this depth map a reference point is derived. Finally, the plane that is parallel to the screen plane and includes the reference point is the one to be shown in natural size on the screen. The calibration uses data of known physical sizes of voxels and the display. The magnification includes both a zoom and a pan operation, through which the screen position of the reference point remains fixed to allow undisturbed focus of attention for the user. There are many possible solutions for deriving the reference point from the depth map. One straightforward approach is to use the point 400p closest to the screen plane 20p as shown in FIG. 15. The derivation of the depth map 300 can be done in different ways, in one implementation a plurality of rays 402, typically at least about fifty (50), and more typically about one-hundred (100) rays, are cast evenly spread in the ROI. The implementation could easily be made much more precise but it is contemplated that it would make little difference for the user experience. For additional discussion of natural size operation, see U.S. Provisional Application Ser. No. 61/448,307, and related application identified by Attorney Docket No. 9514-16, the contents of which are hereby incorporated by reference as if recited in full herein. FIG. 16 is a schematic of exemplary features and/or steps associated with embodiments of the present invention. As shown, a screen is provided that has graphic user interface with a touch-input with a set of base interactions associated with touch gestures available over substantially an entire viewing area and a plurality of alternate interaction icons that are individually movable over the screen via a user touch input (block 200). The basic interaction touch gestures include swiping, tapping, pinching and unpinching (block 202).

Blocks 202-220 are optional features or steps that can be accessed or used based on the movable icons. The icons may provide one, a plurality or all of these optional features or steps. For example, the position of a movable icon on the screen can define different alternate interaction choices accessible by a user (block 220). One of the objects/icons be (virtually) slidably passed to a different user to pass control of that object (block 208).

The movable icons are visually fadable in and out of view on the screen when deployed over a viewing area (block 204). The movable icons can have physical properties, e.g. to simulate physical objects to slide, bounce off each other if they collide, bump or otherwise virtually interact with topology on a visualization on the display and/or gravity (block 206). The icons can include a set of pucks (block 210). The set of icons can be docked along a perimeter of the viewing area of the screen (block 212). The screen can be associated with a collaborative visualization on one or more workstations (block 214). The screen can be a horizontal display (block 216). The controls can accept two-hand inputs, one to activate one of the movable icons and one to carry out a touch gesture to select a choice that carries out a desired interaction associated with the activated alternate interaction icon (block 218).

It is also contemplated that in some particular embodiments, the icons 40, 50, 60 can be configured for a web-based collaborative review of data sets, such as patient medical data sets. Each icon 40, 50, 60 can be "passed" to or controlled by a different remote user. A color, name or other site or user identifier can be assigned (at a beginning of a session or based on a defined portal or web address and the like) that will automatically show when that user "controls" the icon from their site/station. This may allow "experts" to interactively participate and control the visualization of the data set using the MOfAIs for collaborative consultation and the like.

As discussed above, embodiments of the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one (e.g., a workstation computer), partly on one computer, as a stand-alone software package, partly on the workstation's computer or Scanner's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 17:
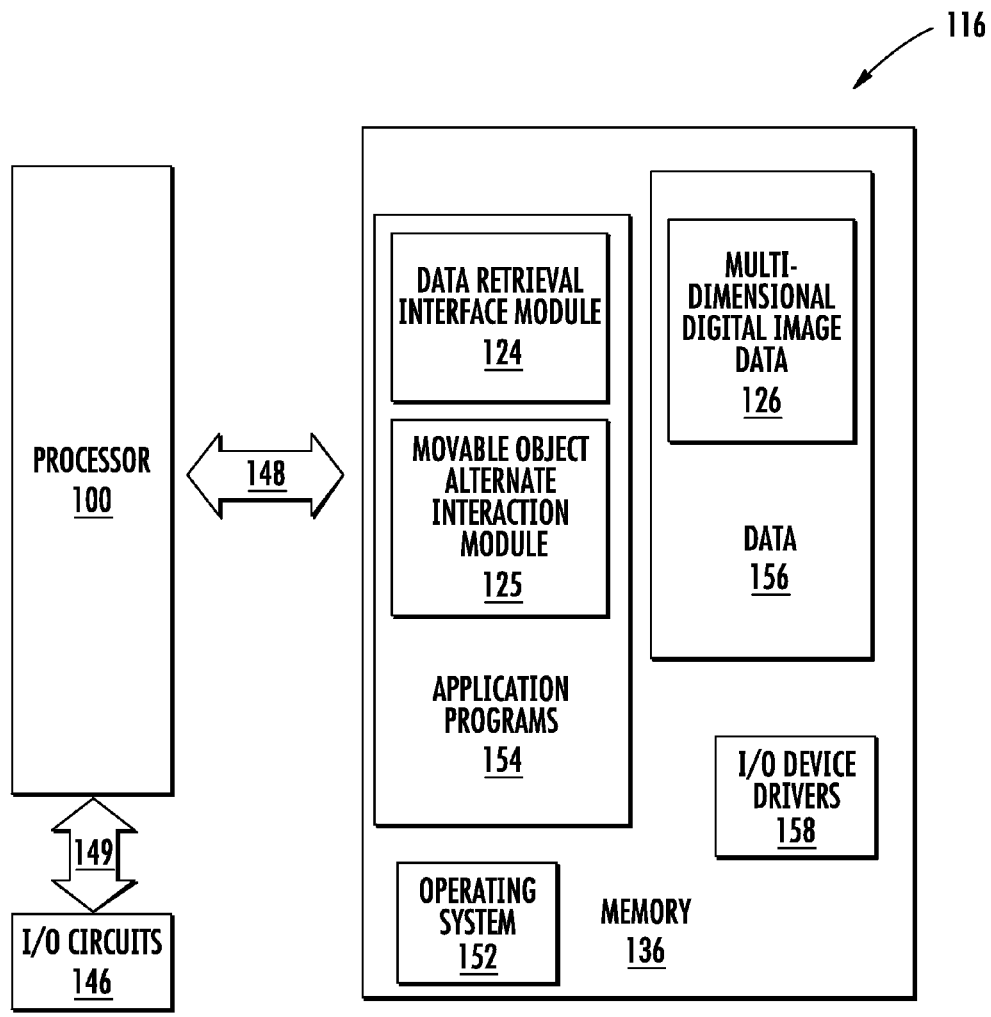
FIG. 17 is a schematic illustration of a data processing circuit or system according to embodiments of the present invention.

As illustrated in FIG. 17, embodiments of the invention may be configured as a data processing system 116, which can be used to carry out or direct operations of the rendering, and can include a processor circuit 100, a memory 136 and input/output circuits 146. The data processing system may be incorporated in, for example, one or more of a personal computer, workstation 10w, server, router or the like. The system 116 can reside on one machine or be distributed over a plurality of machines. The processor 100 communicates with the memory 136 via an address/data bus 148 and communicates with the input/output circuits 146 via an address/data bus 149.

The input/output circuits 146 can be used to transfer information between the memory (memory and/or storage media) 136 and another computer system or a network using, for example, an Internet protocol (IP) connection. These components may be conventional components such as those used in many conventional data processing systems, which may be configured to operate as described herein.

In particular, the processor 100 can be commercially available or custom microprocessor, microcontroller, digital signal processor or the like. The memory 136 may include any memory devices and/or storage media containing the software and data used to implement the functionality circuits or modules used in accordance with embodiments of the present invention. The memory 136 can include, but is not limited to, the following types of devices: ROM, PROM, EPROM, EEPROM, flash memory, SRAM, DRAM and magnetic disk. In some embodiments of the present invention, the memory 136 may be a content addressable memory (CAM).

As further illustrated in FIG. 17, the memory (and/or storage media) 136 may include several categories of software and data used in the data processing system: an operating system 152; application programs 154; input/output device drivers 158; and data 156. As will be appreciated by those of skill in the art, the operating system 152 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data 156 represents the static and dynamic data used by the application programs 154 the operating system 152 the input/output device drivers 158 and other software programs that may reside in the memory 136.

The data 156 may include (archived or stored) digital image data sets 126 that provides stacks of image data correlated to respective patients. As further illustrated in FIG. 17, according to some embodiments of the present invention application programs 154 include a Data Retrieval Interface Module 124 and a Movable Object Alternate Interaction Module 125. The data interface module can be decoupled or isolated from the visualization/rendering module. The application program 154 may be located in a local server (or processor) and/or database or a remote server (or processor) and/or database, or combinations of local and remote databases and/or servers.

While the present invention is illustrated with reference to the application programs 154, and Modules 124, 125 in FIG. 17, as will be appreciated by those of skill in the art, other configurations fall within the scope of the present invention. For example, rather than being application programs 154 these circuits and modules may also be incorporated into the operating system 152 or other such logical division of the data processing system. Furthermore, while the application programs 124, 125 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 17 but may be provided by other arrangements and/or divisions of functions between data processing systems. For example, although FIG. 17 is illustrated as having various circuits and modules, one or more of these circuits or modules may be combined or separated without departing from the scope of the present invention.

Figure 18:
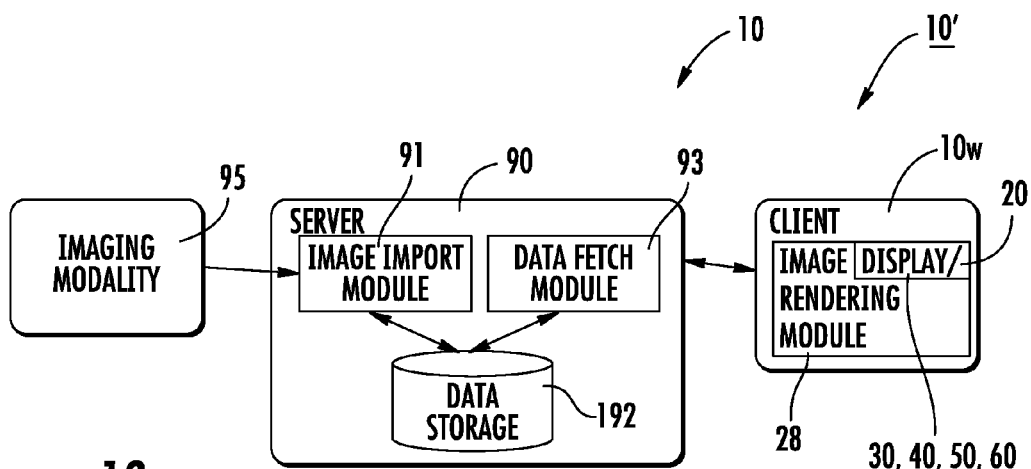
FIG. 18 is a schematic illustration of a medical visualization system according to embodiments of the present invention.

FIG. 18 illustrates that, in particular embodiments, the system 10 can include or be in communication with a PACS (picture archiving and communication system). The system 10 can include, for example, at least one server 90 with an image import module 93, data storage 92, a data fetch module 93, a client (e.g., workstation) 10w and a rendering system 28. The system 10 can optionally be in communication with at least one imaging modality 95 that electronically obtains respective volume data sets (which for medical uses is patient data sets) and can electronically transfer the data sets to the electronic storage 92.

In some particular embodiments, the imaging modality 95 can be any desirable modality such as, but not limited to, NMR, MRI, X-ray of any type, including, for example, CT (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e., a common system may render images for both CT and MRI volume image data). In some embodiments, the system 10 may optionally combine image data sets generated from different imaging modalities 95 to generate a combination image for a patient.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A visualization system, comprising:
    a display; and
    a circuit configured to provide graphic user interface controls with touch input in communication with the display, the graphic user interface (GUI) controls including (i) a set of base interactions associated with touch gestures available over substantially an entire viewing area that displays a visualization of a 2-D, 3-D or 4-D image data set of either (a) a topographic map (b) outer space or (c) a medical image and (ii) a plurality of alternate interaction icons that are individually movable over the display via touch gestures by a user touch to allow one or more users to interact with the visualization presented on the display, wherein the alternate interaction icons each have a set of alternate interaction choices that are different from the set of base interactions and appear on the display only when a selected respective alternate interaction icon is touched, wherein the alternate interaction choices of respective alternate interaction icons, when touched, can be individually selected by a user via concurrent touch input of the selected alternate interaction icon and one of the alternate interaction choices thereof, and wherein the set of base interactions comprises x-y pan, x-y-z rotate and zoom.

2. The system of claim 1, wherein one of the alternate interaction icons provides a possibility to apply default color presets to all or part of the visualization.

3. The system of claim 1, wherein the visualization is of the medical image using a patient medical image data set in communication with the circuit for visualization on the display, and wherein the medial image is a single image that occupies substantially all of the display.

4. The system of claim 1, wherein a first position on the display of a respective alternate icon defines a different set of interaction choices from a second position on the display.

5. The system of claim 1, wherein the alternate interaction icons are configured to simulate physical properties of an object and can be slidably advanced over the display upon a touch gesture simulating a pass.

6. The system of claim 1, wherein the alternate interaction icons are configured to be slidably passed to different users for control of the respective icon and associated set of interaction.

7. The system of claim 1, wherein the alternate interaction icons are configured to simulate a mass and be able to move with a velocity when a touch gesture moves the respective icon with a force and direction.

8. The system of claim 7, wherein when one of the alternate interaction icons collides or hits another, the movements of the icons are configured to simulate a bounce movement associated with a physical collision.

9. The system of claim 1, wherein the GUI controls for the alternate interaction icons are configured to accept two concurrent touch gestures, one by each of two different hands, one touch gesture selecting the alternate interaction icon, and the other hand to use a touch gesture to select one of the associated choices of the touch selected alternate interaction icon, and wherein the alternate interaction icons comprise first, second and third alternate interaction icons, the first, second and third alternate interaction icons providing between 15-50 degrees of freedom for altering visualization parameters of the visualization, wherein the first alternate interaction icon provides Transfer Function (TF) adjustment, the second alternate interaction icon provides TF preset selection and the third alternate interaction icon provides clip plane interaction.

10. The system of claim 1, wherein the alternative interaction icons are configured to fade in and out of view on the visualization.

11. The system of claim 1, wherein the display is a substantially horizontal display having a size that is between 30-100 inches, measured on a diagonal, allowing a plurality of concurrent viewers of the visualization, and wherein the visualization is a single image that occupies substantially all the display.

12. The method of claim 1, wherein the alternate interaction icons are pucks with each having a different visual image representing different sets of alternate interaction choices associated with a respective alternate interaction icon, and wherein, when not selected via touch, the alternate interaction icons reside along an outer perimeter of the visualization.

13. The method of claim 1, wherein the alternate interaction icons comprise first, second and third pucks, the first puck comprising an image of a sun, the second puck comprising an image of scissors and the third puck comprising an image of a paint palette.

14. The method of claim 1, wherein when a respective alternate interaction icon is selected via touch input, a plurality of adjacent icons associated with different actions visually appear on the display and each can be selectively activated via a touch input, and wherein when a user removes the touch input of the selected alternate interaction, the user can continue interaction with the base interaction set.

15. A method of interacting with image data on a display, comprising:
providing a visualization of a data set on at least one display, wherein the visualization is one of a 2-D, 3-D or 4-D image data set of either (a) a topographic map (b) outer space or (c) target anatomy of a medical image;
providing a plurality of independently movable alternate interaction icons on the display that are configured to fade in and out of view;
accepting a touch gesture of a user to independently select one of the plurality of alternate interaction icons on a display and to move each of the alternate interaction icons over at least a major portion of a viewing area on the display; and
providing a set of alternate interaction options associated with the selected alternate interaction icon or altering a way in which the visualization reacts to a base interaction touch gesture in response to the accepted touch gesture,
wherein the alternate interaction icons each have a set of alternate interaction choices that are different from a set of base interactions that comprise x-y pan, x-y-z rotate and zoom that are accessible by touch gesture on the display,
wherein a respective set of alternate interaction choices appear on the display only when a selected respective alternate interaction icon is touched, wherein the alternate interaction choices of respective alternate interaction icons, when touched, can be individually selected by a user via concurrent touch input of the selected alternate interaction icon and one of the alternate interaction choices thereof.

16. The method of claim 15, wherein the set of alternate interaction options is different depending on where on the display the selected alternate interaction icon is located.

17. The method of claim 15, further comprising allowing one user to slidably transfer one or more of the alternate interaction icons to another user.

18. The method of claim 15, wherein the alternate interaction icons are configured to simulate mass associated with a physical property of an object, and wherein the method further comprising bouncing one icon of another in response to a touch gesture by one user.

19. The method of claim 15, wherein the at least one display is a single display oriented as a substantially horizontal display for a collaborative workstation configured to accommodate a plurality of concurrent users.

20. The method of claim 15, wherein one alternate interaction provides a possibility to apply default color presets to all or part of the visualization.

21. The method of claim 15, wherein the visualization the target anatomy from a patient medical data set, and wherein the alternate interaction icons comprise first, second and third alternate interaction icons, the first, second and third alternate interaction icons providing between 15-50 degrees of freedom for altering visualization parameters of the visualization, wherein the first alternate interaction icon provides Transfer Function (TF) adjustment, the second alternate interaction icon provides TF preset selection and the third alternate interaction icon provides clip plane interaction.

22. The method of claim 15, wherein the accepting step is carried out using two concurrent touch gestures, one by each of two different hands, one touch gesture selecting the alternate interaction icon, and the other a choice from a generated set of choices of different interactions associated with the selected icon.

23. A computer program product for providing Graphic User Interface controls to visualization systems of image data sets using a touch screen, the computer program product comprising:

a non-transitory computer readable storage medium having computer readable program code embodied in the medium, the computer-readable program code comprising:

computer readable program code configured to generate a visualization of either (a) a topographic map (b) outer space or (c) target anatomy of a medical image using 2-D, 3-D or 4-D image data set;

computer readable program code configured to generate a plurality of alternate interaction icons that are independently movable across at least a major portion of the touch screen over the visualization, each having at least one associated set of interaction choices, wherein the alternate interaction icons each have a set of alternate interaction choices that are different from base interactions and appear on the display only when a selected respective alternate interaction icon is touched; and computer readable program code configured to allow one or more users to use a touch gesture to select one of the alternate interaction icons to interact with the visualization and/or alter views of the visualization, wherein the alternate interaction icons comprise first, second and third alternate interaction icons providing between 15-50 degrees of freedom for altering visualization parameters of the visualization, and wherein the first alternate interaction icon provides Transfer Function (TF) adjustment, the second alternate interaction icon provides TF preset selection and the third alternate interaction icon provides clip plane interaction.

24. The computer program product of claim 23, wherein the set of interaction choices for at least one icon is dependent on where the icon is located.

* * * * *

UNITED STATES PATENT AND TRADEMARK OFFICE
CERTIFICATE OF CORRECTION

PATENT NO.           : 9,146,674 B2                                          Page 1 of 1
APPLICATION NO.      : 13/218873
DATED                : September 29, 2015
INVENTOR(S)          : Karlsson et al.

It is certified that error appears in the above-identified patent and that said Letters Patent is hereby corrected as shown below:

In the Claims:
Column 20, Claim 21, Line 56: Please correct "visualization the"
　　　　　　　　　　　　　　　　to read -- visualization is the --

Signed and Sealed this
Twenty-second Day of March, 2016

Michelle K. Lee
*Director of the United States Patent and Trademark Office*